United States Patent
Crane

(10) Patent No.: US 9,252,645 B2
(45) Date of Patent: Feb. 2, 2016

(54) DC ELECTRICAL MACHINES

(71) Applicant: GE Energy Power Conversion Technology Ltd, Rugby Warwickshire (GB)

(72) Inventor: Allan David Crane, Gwynedd (GB)

(73) Assignee: GE ENERGY POWER CONVERSION TECHNOLOGY LTD., Warwickshire (GB)

( * ) Notice: Subject to any disclaimer, the term of this patent is extended or adjusted under 35 U.S.C. 154(b) by 261 days.

(21) Appl. No.: 14/011,916

(22) Filed: Aug. 28, 2013

(65) Prior Publication Data

US 2014/0062269 A1   Mar. 6, 2014

(30) Foreign Application Priority Data

Aug. 28, 2012 (EP) .................................... 12182063

(51) Int. Cl.
| | |
|---|---|
| H02K 11/00 | (2006.01) |
| H02P 25/22 | (2006.01) |
| H02P 6/14 | (2006.01) |
| H02K 3/28 | (2006.01) |

(52) U.S. Cl.
CPC .............. H02K 11/0073 (2013.01); H02K 3/28 (2013.01); H02P 6/14 (2013.01); H02P 25/22 (2013.01); *H02K 2213/12* (2013.01); *Y02E 10/725* (2013.01)

(58) Field of Classification Search
CPC . H02K 11/0073; H02K 3/28; H02K 2213/12; H02P 25/22; H02P 6/14; Y02E 10/725
USPC ................. 310/68 D, 71, 68 R, 179, 184–185
See application file for complete search history.

(56) References Cited

U.S. PATENT DOCUMENTS

| | | | | |
|---|---|---|---|---|
| 5,216,339 | A | * 6/1993 | Skybyk ................. | H02K 21/24 310/112 |
| 2004/0119427 | A1 | * 6/2004 | Stridsberg ............... | H02K 3/28 318/400.29 |

(Continued)

FOREIGN PATENT DOCUMENTS

| | | |
|---|---|---|
| EP | 1798847 | 6/2007 |
| EP | 1879280 | 1/2008 |

(Continued)

OTHER PUBLICATIONS

European Search Report corresponding European Application No. 12182063.3, Dated Jan. 21, 2013.

*Primary Examiner* — Thanh Lam

(74) *Attorney, Agent, or Firm* — GE Global Patent Operation; Catherine J. Toppin

(57) ABSTRACT

A dc electrical machine with a large number of phases. The machine includes a rotor and a stator assembly. The rotor has Np rotating field poles. The stator has Ns winding slots, where Ns/Np is a non-integer ratio. A stator winding includes a plurality of coils received in the winding slots and defines a plurality of stator phases. A power electronic switching assembly includes first and second dc load terminals that can be connected to external equipment and a plurality of switching modules. Each switching module includes power electronic devices and is connected to a respective stator coil. A first proportion of the switching modules are connected together in series between the first and second dc load terminals and a second proportion of the switching modules are connected together in series between the first and second dc load terminals to define two parallel dc circuits.

15 Claims, 16 Drawing Sheets

(56) References Cited

U.S. PATENT DOCUMENTS

2010/0244599 A1* 9/2010 Saban .................. H02K 3/28
310/71
2013/0241368 A1* 9/2013 Liu ..................... H02P 6/085
310/68 D

FOREIGN PATENT DOCUMENTS

| EP | 2403111 | 1/2012 |
| GB | 2117580 | 10/1983 |
| GB | 2431528 | 4/2007 |
| WO | 9808291 | 2/1998 |

* cited by examiner

DC ELECTRICAL MACHINES

FIELD OF THE INVENTION

Embodiments of the present invention relate to dc electrical machines, and in particular to machines with high torque density and high power density, which are efficient and reliable, and are simple to install and commission.

BACKGROUND OF THE INVENTION

A dc rotating electrical machine typically includes a rotor surrounded by a wound stator. A rotor connected commutator with copper segments and stationary brushgear are used to control the commutation of current in the rotor winding based on the angular position of the rotor. Brush commutated dc electrical machines are known to be capable of high air gap shear stress but their practical torque density performance is limited by the brush commutation process. The stationary brushgear and rotating commutator converts the dc terminal voltage of the electrical machine into a polyphase ac voltage that rotates within the armature winding in a direction and at a speed that causes the armature magneto-motive force (mmf) to be substantially stationary and aligned in quadrature with the field poles. Thus, rotor mmf and stator field space harmonic spectra are substantially synchronised, thereby contributing to the mean shaft torque. It is this near ideal relationship between rotor and stator space harmonics that allows the majority of the air gap circumference of the brush commutated dc electrical machine to operate at a high air gap shear stress.

However, the brush commutation process for dc electrical machines is complicated and has certain limitations.

Armature coil voltage is used to cause armature current commutation. This means that the brush position must be set to allow sufficient time for current to be reduced to a low level by the time an outgoing commutator segment breaks contact with the trailing edge of the brush in order to avoid arcing (so-called 'under-commutation'), and also to avoid excessive time for current reduction and subsequent current reversal by the time an outgoing commutator segment breaks contact with the trailing edge of the brush in order to avoid arcing (so-called 'over-commutation'). Both under- and over-commutation arcing modes are typically destructive.

There is an overriding requirement that the voltage between commutator segments immediately after the outgoing commutator segment breaks contact with the trailing edge of the brush must be sufficiently low to avoid flashover. There is also an overriding requirement that the brush current density must be low in order to avoid excessive heating, power losses, and the risks of sustained arcing flashover.

In the most basic brush commutated dc electrical machine the timing of brush commutation is critical and is severely performance limiting because ideal brush angular position varies with both armature current and speed, i.e. there is no single ideal angular position for brushgear. It is therefore accepted that in such dc electrical machines some commutator arcing is inevitable. However, in large dc electrical machines the risks of arcing and flashover can be alleviated by the use of compoles (or interpoles) which serve to offset the field position in response to variation in armature current.

As a result, the rotating commutator and stationary brushgear tend to be large and complex. Moreover, the compoles occupy space within the electrical machine that could otherwise be used to increase the total air gap flux and torque density. This means that the torque density for a given peak air gap shear stress is relatively low. Brush commutated dc electrical machines are inherently low voltage machines, e.g. less than 1 kV.

Some of the problems of brush commutation can be overcome by the use of a load commutated inverter (LCI). In electrical machines that use a LCI the field is produced by the rotor winding which commonly incorporates brushless excitation. The armature winding is located in the stator and commonly uses three or six phases. A static frequency converter replaces the brush commutator. A basic naturally-commutated power converter operating at low switching frequency can be remotely located. Such electrical machines have increased torque density and high efficiency but are known to produce undesirable torque pulsations. They also cannot employ the near ideal relationship between rotor and stator space harmonics described above. Hence the mean air gap shear stress is typically less than that for a brush commutated dc electrical machine. However, one advantage of electrical machines that use an LCI is that it is possible to have a higher line voltage rating, e.g. up to 11 kV.

More sophisticated static frequency converters have been used to allow the torque pulsations of the LCI to be substantially eliminated but the converters are complex and are less efficient. As line voltage rating increases, such converters become increasingly complex and it is exceptional for them to be rated at greater than 6.6 kV.

Electronically commutated brushless dc electrical machines are known. GB 2117580 discloses a brushless dc electrical machine that employs an electronic switching circuit which uses armature coil voltage to cause natural commutation of thyristors. Other brushless dc electrical machines use auxiliary power circuits such as those disclosed in GB 2431528 to cause forced commutation by thyristor reverse recovery. These electronic commutators have been surpassed by the use of semiconductor power devices that are capable of being turned on and off by gate control, e.g. gate turn off thyristors (GTOs). Such electronic commutators are described in EP 1798847 to the present applicant. A possible shortcoming of electronically commutated electrical machines is that they are not inherently suited to high voltage dc operation since it is necessary to use series-connected semiconductor power devices and to insulate the main wall of the armature winding for high voltage ac stresses—note that the dominant voltage stress in the armature insulation is ac since each terminal in the armature winding is sequentially connected to positive and negative dc terminals.

EP 2403111 describes a wind turbine generator with a rotor and a stator. The stator has a plurality of stator coils, each coil being connected to a diode rectifier. A generator-utility grid interface is provided where the diode rectifiers are assigned to each phase of a utility grid.

BRIEF SUMMARY OF THE INVENTION

According to an embodiment of the present invention there is provided a dc electrical machine (e.g. a motor or generator) comprising a rotor having Np rotating field poles, an armature (for example in the form of a stator assembly) having Ns winding slots (where Ns/Np is a non-integer ratio), an armature winding having a plurality of coils received in the winding slots (the armature winding defining a plurality of armature phases), and a power electronic switching assembly. The power electronic switching assembly including a first dc load terminal, a second dc load terminal, and a plurality of switching modules. Each switching module having two ac terminals and two dc terminals and including power electronic devices. Wherein each coil, of the armature winding having a plurality of coils, is connected to the ac terminals of a respective switching module. Wherein a first proportion of the switching modules have their dc terminals connected together in series between the first and second dc load terminals and a second proportion of the switching modules have their dc terminals connected together in series between the first and second dc load terminals to define two parallel dc circuits.

According to embodiments of the present invention, the non-integer ratio of Ns/Np can be expressed as n±δ where n is an integer and δ can be defined in terms of a vernier shift that is determined by the physical design and construction of the electrical machine.

According to embodiments of the present invention, in large diameter, low speed machines that must have a relatively high number of poles (e.g. Np>80) in order to minimize the flux density in the stator back iron, the vernier shift can be provided by increasing or decreasing the number of poles relative to the number of poles that can be found in a conventional electrical machine for a given number of slots and which would provide an integer ratio of Ns/Np. For example, if a conventional electrical machine with a requirement to have Ns/Np=3 had 360 slots (Ns=360) then it would have 120 poles (Np=120). According to this methodology the vernier shift can be expressed as ±2 m poles over the circumference of the rotor when compared to the conventional electrical machine, where m is an integer and thus the minimum possible vernier shift is ±2 poles over the circumference of the rotor. Or put another way, for a given number of slots, the rotor will have a total number of poles that is either two more or two fewer than the total number of poles that can be found in a conventional electrical machine. In the example given above with 360 slots then the electrical machine according to embodiments of the present invention with a minimum value of m=1 would have 118 or 122 poles (Np=118 or Np=122) which corresponds to Ns/Np=3.05 or Ns/Np=2.95 and δ=0.05. The principle benefit of this methodology is that it allows existing conventional designs of stator lamination punchings and coils (either single-layer or two-layer coils can be used) to be retained. It will be readily appreciated that the rotor, in an embodiment, having a bespoke design does not suffer any penalty in the process. The methodology is equally applicable to other large, high pole number machines with a relatively small number of slots per pole. For example, it would be possible to make an electrical machine with Ns/Np=5±δ (i.e. where n=5) even though the use of nominally five slots per pole would not be conventional.

According to embodiments of the present invention, in the case of smaller machines having relatively few poles (e.g. Np<16) and a relatively high number of slots per pole (e.g. 9<Ns/Np<15) the minimum vernier shift according to the above methodology may be excessively coarse and in this situation it is equally applicable to achieve the desired vernier shift using a methodology by increasing or decreasing the number of armature slots Ns relative to the number of slots that would be found in a conventional electrical machine for a given number of poles and which would provide an integer ratio of Ns/Np. According to this methodology the vernier shift can be expressed as ±2q slots over the circumference of the armature when compared with the conventional electrical machine, where q is an integer and thus the minimum possible vernier shift is ±2 slots over the circumference of the armature. Some resultant values of Ns would preclude the use of armature windings that employ single-layer coils but since the methodology is directed at smaller machines, it is possible to use two-layer coils that can be accommodated in any convenient number of slots. Also, if discrete slots are not provided in the armature but instead each coil is wound around an armature tooth (i.e. a tooth concentrated winding) then if Nt is the number of teeth, for all practical purposes Nt=Ns and may be any convenient number.

According to embodiments of the present invention, the poles are equally distributed around the circumference of the rotor and the vernier shift is consistent around the armature or the circumference of the electrical machine. This means that the vernier shift causes the electrical machine according to embodiments of the present invention to have a relatively high number of armature phases.

A conventional electrical machine with an integer or non-integer number of slots per pole has a plurality of internal armature phases that are interconnected to provide three phases at the outgoing terminals (it being a common requirement to series connect, in the ac domain, coils whose fundamental voltages are not in phase). In the case of conventional machines having so called 'fractional slot windings', i.e. those that have a non-integer number of slots per pole, it is a mandatory requirement to series connect, in the ac domain, coils whose fundamental voltages are not in phase. More particularly, the internal phase sequence of conventional electrical machines is repeated in synchronism with rotor rotation every two pole pitches. In the case of conventional machines having fractional slot windings, although the internal phase sequence is repeated in synchronism every two pole pitches, the internal phase voltages may be un-balanced within the space of two pole pitches and phase balance at the outgoing terminals is only achieved by series connecting groups of coils that extend over multiple pairs of pole pitches in the ac domain. Furthermore, the use of conventional ac domain interconnected fractional slot windings precludes the use of single-layer coils. However, the electrical machine according to embodiments of the present invention may have as many as Ns armature phases (i.e. P=Ns) since the phase sequence in successive pole pitches either progresses or retrogresses at a rate according to the magnitude and polarity of the vernier shift—a positive vernier shift causing a progressive phase sequence and a negative vernier shift causing a regressive phase sequence. This means that whereas the phase sequence in a conventional machine is repeated at regular and closely spaced intervals about the circumference of the armature and rotates in the same direction and at the same speed as the rotor, the electrical machine according to embodiments of the present invention has a phase sequence wherein armature coils that are at widely spaced intervals about the circumference of the armature are adjacent in the electrical phase sequence and this phase sequence may rotate in the same or opposite direction and at a different speed to the rotor. The number of armature phases is also dependent upon the topology of the armature coils. For example, for a given rotor topology, an armature that employs single-layer coils will have half the number of armature phases of an equivalent armature that employs two-layer coils.

The following description assumes that the electrical machine is designed to provide the maximum number of phases. However, it may be technically possible, depending on the number of poles, for example, to design an electrical machine with fewer than the maximum number of phases. For this reason the following description will be understood to be illustrative and that the electrical machine according to embodiments of the present invention is not limited to having the indicated number of phases P. In the case where the first methodology is used to achieve the above-described vernier shift expressed as ±2m poles over the circumference of the rotor when compared to the conventional electrical machine, when single-layer coils are used with an even number of slots then P=Ns/4m and when two-layer coils are used with an even number of slots then P=Ns/2m. When the second methodology is used to achieve the above-described vernier shift, when single-layer coils are used with a number of slots Ns such that Ns/4 is an integer then P=Ns/4 and when two-layer coils are used with an even number of slots then P=Ns/2. In the case where the armature has an odd number of slots then P=Ns and it is necessary to use wither two-layer coils or tooth coils.

According to embodiments of the present invention, the methodology could be, for example, where Ns=360 and Np=118 or Np=122, where the vernier shift is set to the minimum value of δ by selecting m=1, and where the armature is wound with two-layer coils then, irrespective of the polarity of the vernier shift, the electrical machine according to embodiments of the present invention would have 180 effective armature phases (P=180). More precisely, the armature would have a first group of 180 coils with 2° electrical phase intervals and a second group of 180 coils with 2° electrical phase intervals in antiphase with the coils of the first group—it being industry standard convention that a coil and an antiphase coil are considered to be two elements within a single effective armature phase. However, if the armature is wound with single-layer coils then, irrespective of the polarity of the vernier shift, the electrical machine according to embodiments of the present invention would have 90 effective armature phases (P=90). More precisely, the armature would have a first group of 90 coils with 4° electrical phase intervals and a second group of 90 coils with 4° electrical phase intervals in antiphase with the coils of the first group. When derivatives of the example are considered where m=2 (i.e. Np=116 or Np=124) then the electrical machine will have 90 or 45 armature phases with 4° or 8° electrical phase intervals depending on whether two-layer or single-layer coils are used, respectively. In the case where the armature has an odd number of slots with two-layer coils or a tooth concentrated winding then the armature would have 360 armature phases (P=360) or more particularly a single group of 360 coils with 1° electrical phase intervals. In the case where the armature has an even number of slots (and teeth) with a tooth concentrated winding then the armature would have 180 phases (P=180) or more precisely, the armature would have a first group of 180 coils with 2° electrical phase intervals and a second group of 180 coils with 2° electrical phase intervals in antiphase with the coils of the first group.

According to embodiments of the present invention, the magnitude of the vernier shift also influences how the coils can be interconnected by the switching modules of the power electronic switching assembly, and how the switching modules are controlled. With the exception of the case where the electrical machine has an odd number of coils and an odd number of armature phases, the electrical machine according to an embodiment of the present invention will have an even number of coils in each armature phase and the modulus of the open circuit voltage waveforms of every coil in a particular armature phase are approximately equal and, in order to operate each coil under equal and ideal electromagnetic conditions, in an embodiment the switching events in each switching module that is connected respectively to coils within that particular armature phase are executed substantially simultaneously. In other words, all coils within a particular armature phase of the electrical machine can operate with substantially the same power factor and harmonic structure. It therefore follows that electrical machines with first and second groups of coils as described above should operate with switching events in any particular coil being mirrored by an antiphase switching event in a coil that is 180 mechanical degrees displaced around the armature so that two switching events occur substantially simultaneously in two separate switching modules connected to coils on diametrically opposite sides of the armature assembly. Similarly, electrical machines that have first, second, third and fourth groups of coils must operate with switching events in any particular coil being mirrored by an identical switching event in a coil that coil that is 180 mechanical degrees displaced around the armature and by two identical antiphase switching events in coils that are 90 and 270 mechanical degrees displaced around the armature so that four switching events occur substantially simultaneously in four separate switching modules connected to coils equally spaced around the armature assembly. Any convenient number of coil groups and corresponding simultaneous switching events can be employed but it will be readily understood that an important objective is to employ the greatest number of armature phases while simplifying dc domain interconnection of coils, and for this reason, in an embodiment, the electrical machine has the minimum number of coil groups and simultaneous switching events.

Conventional coils of any convenient form can be used but they are connected together in series in the dc domain (i.e. at the dc terminal-side of the switching modules) to define at least two parallel dc circuits. In an embodiment, they are not connected together in the ac domain. In an embodiment, each coil has ac terminals which are connected to the ac terminals of the corresponding switching module which controls the coil current. It will be readily appreciated that the coils can be uniformly disposed in approximately, but not exactly, n slots per pole. In a common arrangement then n=3 but it is possible for the electrical machine to have other numbers of slots per pole as noted above. However, in an embodiment, the coils can connect together in the ac domain, this remains a technical possibility and is still considered to be within the scope of the embodiments of the present invention. Any reference to a switching module (or its H-bridge—see below) being connected to a coil should therefore be understood as not excluding the option for it to be connected to two or more coils depending on the machine design. For example, in machines with multiples of four coils it would be technically possible to series connect pairs of physically adjacent or at least closely located coils in the ac domain and to connect each pair of coils to a single switching module. The dc terminals of the switching modules would then be interconnected as described elsewhere. Such a machine would have half of the number of armature phases and half the number of switching modules compared to a machine where each switching module is connected to just a single coil. This ac interconnection of coils would lead to phase summation of coil voltages. Accordingly, the summated fundamental components of voltage of two series-connected coils would be less than twice the fundamental component of voltage of a single coil. The disadvantage of output voltage reduction that results from connecting each switching module to two or more coils in the ac domain would have to be considered by the machine designer and balanced against the benefit of having fewer components and a less complicated power electronic switching assembly.

According to embodiments of the present invention, as noted above, the coils can be two-layer coils (e.g. conventional diamond coils) with Ns coils being received in the winding slots and defining a maximum of Ns/2 armature phases, e.g. where m=1 when the first methodology for the vernier shift is used. An exception is when Ns is an odd number when Ns coils are received in the winding slots and define a maximum of Ns armature phases. In an embodiment, the coils can be single-layer coils with Ns/2 coils being received in the winding slots and defining a maximum of Ns/4 armature phases, e.g. where m=1 when the first methodology for the vernier shift is used. In an embodiment, the coils can be in the form of a tooth concentrated winding where each coil is wound around an armature tooth. Such an arrangement would have Ns coils defining a maximum of Ns armature phases when Ns is odd and Ns/2 armature phases when Ns is even.

According to embodiments of the present invention, the power electronic switching assembly of the electrical machine has at least first and second dc load terminals that may be connected to external equipment. For example, a single channel machine has a positive dc load terminal and a negative dc load terminal while a dual channel machine has a pair of positive dc load terminals and a pair of negative dc load terminals that can be connected in parallel to external equipment. In practice the power electronic switching assembly may be partitioned into an even number of segments, each segment having one or more switching modules and first and second local dc terminals, e.g. a local positive dc terminal and a local negative dc terminal. The first and second local dc terminals of a plurality of segments may be interconnected with one another and with the first and second dc load terminals of the power electronic switching assembly to interconnect the segments. In an embodiment, the respective local dc terminals of the power electronic switching assembly are disposed at regular intervals around the circumference of the armature as described in more detail below, the dc load terminals can be co-located within a suitable terminal enclosure to facilitate easy connection of the electrical machine to external equipment.

According to embodiments of the present invention, some specific arrangements are described below with reference to FIGS. 14A to 14D in which the individual switching modules of the power electronic switching assembly are represented schematically by square boxes. Each of FIGS. 14A to 14D includes an upper diagram which shows how the switching modules and local dc terminals of respective segments of the power electronic switching assembly are physically arranged around the circumference of the armature or stator assembly, and a lower diagram which shows schematically how the switching modules are interconnected. The number of switching modules per segment has been limited in the interest of clarity.

According to embodiments of the present invention, in an a first arrangement shown in FIGS. 14A and 14B the electrical machine has a positive dc load terminal DC+ and a negative dc load terminal DC−. The switching modules of the power electronic switching assembly define two parallel dc circuits. More particularly, a first proportion (e.g. 50% for symmetrical dc circuits and an even number of armature phases (i.e. FIG. 14A) or A% for asymmetrical dc circuits and an odd number of armature phases (i.e. FIG. 14B)) of the switching modules are connected together in series to define a first dc circuit that extends between the dc load terminals and a second proportion (e.g. 50% for symmetrical dc circuits or B%= (100−A%) for asymmetrical dc circuits) of the switching modules are connected together in series to define a second dc circuit that extends between the dc load terminals. The power electronic switching assembly is therefore partitioned into two segments, each segment corresponding to a dc circuit. The local positive dc terminals Seg1+ and Seg2+ of the first and second segments, respectively, are positioned immediately adjacent to one another and are interconnected to each other and to the positive dc load terminal DC+. Similarly, the local negative dc terminals Seg1− and Seg2− of the first and second segments, respectively, are positioned immediately adjacent to one another and are interconnected to each other and to the negative dc load terminal DC−. It will therefore be readily appreciated that in the first arrangement the power electronic switching assembly includes a total of four local dc terminals that define two interconnected pairs. One of the interconnected pairs is connected to the positive dc load terminal DC+ and the other of the interconnected pairs is connected to the negative dc load terminal DC−. One of the interconnected pairs of local dc terminals can define a circumferential datum of the armature and the magnitudes and polarities of the voltages that are developed in the parallel dc circuits on the opposite sides (e.g. the clockwise and counter-clockwise sides) of the datum are, in an embodiment, substantially balanced. The individual local dc terminals of each segment can be located substantially 180 mechanical degrees apart as shown in FIGS. 14A and 14B. The interconnected pairs of local dc terminals can similarly be located substantially 180 mechanical degrees apart.

According to embodiments of the present invention, in an arrangement shown in FIG. 14C the electrical machine has a positive dc load terminal DC+ and a negative dc load terminal DC−. The switching modules of the power electronic switching assembly define four parallel dc circuits. More particularly, a first proportion (e.g. 25% for symmetrical dc circuits and an even number of armature phases) of the switching modules are connected together in series to define a first dc circuit that extends between the dc load terminals, a second proportion (e.g. 25% for symmetrical dc circuits) of the switching modules are connected together in series to define a second dc circuit that extends between the dc load terminals, a third proportion (e.g. 25% for symmetrical dc circuits) of the switching modules are connected together in series to define a third dc circuit that extends between the dc load terminals, and a fourth proportion (e.g. 25% for symmetrical dc circuits) of the switching modules are connected together in series to define a fourth dc circuit that extends between the dc load terminals. The power electronic switching assembly is therefore partitioned into four segments, each segment corresponding to a dc circuit. The local negative dc terminals Seg1− and Seg2− of the first and second segments, respectively, are positioned immediately adjacent to one another and are interconnected to each other and to the negative dc load terminal DC−. The local positive dc terminals Seg2+ and Seg3+ of the second and third segments, respectively, are positioned immediately adjacent to one another and are interconnected to each other and to the positive dc load terminal DC+. The local negative dc terminals Seg3− and Seg4− of the third and fourth segments, respectively, are positioned immediately adjacent to one another and are interconnected to each other and to the negative dc load terminal DC−. The local positive dc terminals Seg4+ and Seg1+ of the fourth and first segments, respectively, are positioned immediately adjacent to one another and are interconnected to each other and to the positive dc load terminal DC+. It will therefore be readily appreciated that in the second arrangement the power electronic switching assembly includes a total of eight local dc terminals that define four interconnected pairs. Two of the interconnected pairs are connected to the positive dc load terminal DC+ and two of the interconnected pairs are connected to the negative dc load terminal DC−. One of the interconnected pairs of local dc terminals can define a circumferential datum of the armature and the magnitudes and polarities of the voltages that are developed in the parallel dc circuits on the opposite sides (e.g. the clockwise and counter-clockwise sides) of the datum are, in an embodiment, substantially balanced. The individual local dc terminals of each segment can be located substantially 90 mechanical degrees apart as shown in FIG. 14C. The interconnected pairs of local dc terminals can similarly be located substantially 90 mechanical degrees apart. More particularly, the two interconnected pairs of local dc terminals that are connected to the positive dc load terminal can be located substantially 180 mechanical degrees apart while the two interconnected pairs of local dc terminals that are connected to the negative dc load terminal can be located substantially 180 mechanical degrees apart.

According to embodiments of the present invention, in an arrangement shown in FIG. 14D then the electrical machine is a dual channel machine with positive dc load terminals DC1+ and DC2+ and negative dc load terminals DC1− and DC2−. The switching modules of the power electronic switching assembly define four parallel dc circuits. More particularly, a first proportion (e.g. 25% for symmetrical dc circuits and an even number of armature phases) of the switching modules are connected together in series to define a first dc circuit that extends between first and second dc load terminals DC1+ and DC1−, a second proportion (e.g. 25% for symmetrical dc circuits) of the switching modules are connected together in series to define a second dc circuit that extends between the first and second dc load terminals DC1+ and DC1−, a third proportion (e.g. 25% for symmetrical dc circuits) of the switching modules are connected together in series to define a third dc circuit that extends between third and fourth dc load terminals DC2+ and DC2−, and a fourth proportion (e.g. 25% for symmetrical dc circuits) of the switching modules connected together in series to define a fourth dc circuit that extends between the third and fourth dc load terminals DC2+ and DC2−. The power electronic switching assembly is therefore partitioned into four segments, each segment corresponding to a dc circuit. The local negative dc terminals Seg1− and Seg2− of the first and second segments, respectively, are positioned immediately adjacent to one another but they are not interconnected to each other. The local positive dc terminals Seg2+ and Seg3+ of the second and third segments, respectively, are positioned immediately adjacent to one another but they are not interconnected to each other. The local negative dc terminals Seg3− and Seg4− of the third and fourth segments, respectively, are positioned immediately adjacent to one another but they are not interconnected to each other. The local positive dc terminals Seg4+ and Seg1+ of the fourth and first segments, respectively, are positioned immediately adjacent to one another but they are not interconnected to each other. The local positive dc terminals Seg1+ and Seg3+ of the first and third segments, respectively, are interconnected to each other and to the first dc load terminal DC1+. The local negative dc terminals Seg1− and Seg3− of the first and third segments, respectively, are interconnected to each other and to the second dc load terminal DC1−. The local positive dc terminals Seg2+ and Seg4+ of the second and fourth segments, respectively, are interconnected to each other and to the third dc load terminal DC2+. The local negative dc terminals Seg2− and Seg4− of the second and fourth segments, respectively, are interconnected to each other and to the fourth dc load terminal DC2−. It will therefore be readily appreciated that in the third arrangement the power electronic switching assembly includes a total of eight local dc terminals that define four interconnected pairs. The individual local dc terminals of each segment can be located substantially 90 mechanical degrees apart as shown in FIG. 14D. However, unlike in the first and second arrangements, the local dc terminals that define each interconnected pair are not positioned immediately adjacent to one another, but are located substantially 180 mechanical degrees apart. One of the immediately adjacent but non-interconnected pairs of local dc terminals can define a circumferential datum of the armature and the magnitude and polarities of the voltages that are developed in the parallel dc circuits on the opposite sides (e.g. the clockwise and counter-clockwise sides) of the datum are, in an embodiment, substantially balanced. More particularly, this balance is rendered substantially independent of the respective channels of the dual channel arrangement as a result of the parallel connected segments Seg1 and Seg3 being disposed substantially 180 mechanical degrees apart and the parallel connected segments Seg2 and Seg4 being disposed substantially 180 mechanical degrees apart.

According to embodiments of the present invention, a datum may be set anywhere about the circumference of the armature that coincides substantially with a local dc terminal at the physical start or end of a series connected string of switching modules that forms one of the dc circuits or segments of the power electronic switching assembly. The voltages that are developed on either side of such a datum will be substantially balanced when an equal number of coils are employed per dc circuit or when an odd number of phases are utilised and the number of phases is large, irrespective of the number of parallel dc circuits or channels.

According to embodiments of the present invention, the arrangement shown in FIGS. 14A and 14B, with symmetrical dc circuits might be considered to be 'benchmark' arrangement with mean dc voltage Vdc=1 pu and dc load terminal current Idc=1 pu. By comparison, for the second arrangement Vdc=0.5 pu and Idc=2 pu and for the third arrangement Vdc=0.5 pu and Idc=2 pu when the machine is defined as a dual channel machine with two channels effectively being connected in parallel by external equipment, each channel having ratings of Vdc=0.5 pu and Idc=1 pu. Although not shown, the two channels of the third arrangement could in principle be connected in series by connected the second dc load terminal DC1− to the third dc load terminal DC2+ thereby giving Vdc=1 pu and Idc=1 pu at the first and fourth dc load terminals DC 1+ and DC2−. For the arrangement shown in FIGS. 14A and 14B with asymmetrical dc circuits then the degree of asymmetry will be minimal because a large number of phases are employed and the currents in the first and second parallel dc circuits would be insufficiently imbalanced to be problematic. The asymmetrical arrangement would have approximately the same total number of modules as the symmetrical arrangement so that Vdc≈1 pu and Idc≈1 pu. Harmonic, variable load and failure mode aspects of symmetry are described in more detail below.

According to embodiments of the present invention, the power electronic switching assembly includes two segments and four local dc terminals and the local dc terminals of each segment will, in an embodiment, be located substantially 180 mechanical degrees apart. If the power electronic switching assembly includes more than two segments and more than four local dc terminals, for example for a single channel machine with four segments or a dual channel machine, then the local dc terminals of each segment can be located the appropriate number of degrees apart. The local dc terminals that are interconnected (i.e. to form an interconnected pair of local dc terminals) can be positioned adjacent to each other, or located the appropriate number of degrees apart. Different arrangements of dc circuit can be provided but all satisfy the above requirement for at least a first proportion of the switching modules to be connected together in series between the first and second dc load terminals and a second proportion of the switching modules to be connected together in series between the first and second dc load terminals to define two parallel dc circuits. In general terms then any convenient number of additional parallel dc circuits of series-connected switching modules can be provided between the first and second load dc terminals. In a dual channel machine, third and fourth dc load terminals are provided with any convenient number of parallel dc circuits being provided between the first and second dc load terminals and between the third and fourth dc load terminals. For single or dual channel machines that employ an even number of coils and have more than two parallel dc circuits: (i) the number of coils in each dc circuit can be equal, (ii) an equal number of diametrically opposed coils can be provided in each dc circuit, and (iii) the interconnection between switching modules and between switching modules and external equipment through the dc load terminals can be configured to minimize inter-coil voltage.

According to embodiments of the present invention, in all arrangements the switching modules will be interconnected in the dc domain so as to comply with requirements such as the minimization of inter-coil voltage under normal operating conditions, this being achieved by the appropriate positioning of the local dc terminals of like polarity immediately adjacent to one another so as to permit their direct interconnection in the dc domain, or their effective interconnection in the dc domain by external equipment. According to embodiments, dual channel machines that are operating under normal conditions, the external equipment is responsible for minimizing the inter-coil voltages, i.e. the voltage between immediately adjacent but non-interconnected pairs of local dc terminals. However, it will be readily understood that a dual channel machine has two pairs of independently galvanically isolated dc load terminals and that these could settle at different common mode voltages under fault conditions. Consequently, a substantial fault voltage could be developed between respective local dc terminals that are positioned immediately adjacent to one another.

According to embodiments of the present invention, the main wall insulation for the coils will be dominated by a dc voltage component and inter-coil insulation requirements are minimized in single channel machines under all operating conditions and in dual channel machines under normal operating conditions. The main wall insulation can be inherently self-stress grading within its bulk and over its surfaces under conditions wherein the voltage stress is predominantly dc in nature with substantially less significant ac components being present. More particularly, the main wall insulation can contain nano-particle non-linear stress grading throughout its bulk, allowing a relatively thin main wall to be employed and thereby reducing main wall thermal resistance while providing partial discharge-free and low loss operation. Inter-coil voltages are particularly low and comprise dc and ac components that are insufficient to cause partial discharge, thereby allowing endwinding insulation to be simplified. Inter-turn voltages within each coil are comparable to those in conventional electrical machines and conventional inter-turn insulation can be used.

According to embodiments of the present invention, since the coils are connected together in the dc domain, many phases can be provided without having to use complex endwinding interconnections, ac terminations and ac insulation systems. More particularly, a dc electrical machine according to embodiments of the present invention may have many phases per slot per pole. In permanent magnet generators it is known to limit the number of slots per pole in order to reduce the effects of armature reaction and/or to reduce the stator back of core radial depth requirement, and the present invention allows these benefits to be retained while still having a high number of armature phases. Conventional permanent magnet generators typically have three slots per pole (n=3) and the number of armature phases of conventional ac interconnected windings in such machines is normally limited to three or six. However, a permanent magnet generator according to an embodiment of the present invention having approximately three slots per pole would have many (e.g. >70) armature phases.

According to embodiments of the present invention, the coils can be connected in the dc domain to provide phase cancellation of coil voltage harmonics thereby minimizing dc terminal voltage ripple and minimizing circulating currents that flow in the parallel dc circuits between the first and second dc load terminals and, where appropriate, in the parallel dc circuits between the other additional dc load terminals, e.g. in a dual channel machine. The dc terminal voltage of each switching module is dominated by the second harmonic of the associated coil voltage but open circuit coil voltage and current/impedance related voltage harmonics will be synchronously transposed to the dc terminals of each switching module. The commutation process that is carried out by the switching modules will affect the coil terminal voltage harmonics and will also contribute to the integer harmonic voltage spectrum at the dc terminals of each switching module. The power factor and harmonic spectrum of coil current is controlled as described below and is defined so as to allow coils to operate under substantially equal conditions. It follows that coil terminal voltage and switching module dc terminal voltage spectra are phase displaced by the phase interval at stator fundamental frequency. In machines that employ an even number of coils the diametrically opposed coil voltages are in antiphase. But since coil output is either rectified or inverted by the switching modules in order to convert from ac to dc or vice versa, the voltage ripple spectra on the dc terminals of the two associated and diametrically opposed switching modules are in phase. Since this phase relationship applies to all diametrically opposed pairs of coils and their associated switching modules it follows that the voltage ripple is identical in the parallel dc circuits of machines having two parallel connected dc circuits and hence harmonic circulating currents that flow between the parallel dc circuits are minimal. In such machines the approximate symmetry of commutating inductances, coil resistances and switching module device 'on' state losses lead to the minimization of dc mean circulating current and load power is drawn from or fed into each channel equally. Similarly, such harmonic and dc mean circulating currents are minimal in machines where the number of armature phases P when divided by the number of parallel connected dc circuits yields an even number as a result. Symmetrical dc voltage ripple and minimization of dc circulating currents is also achieved within each channel of dual channel machines having four dc load terminals when the two parallel dc circuits within any channel comprise an equal number of diametrically opposed coils and load power is drawn from or fed into each channel equally. Under these circumstances, the voltage ripple between the first and second dc load terminals is approximately equal in magnitude to, and in phase with, the voltage ripple between the third and fourth dc load terminals. When the two parallel dc circuits within each channel comprises an equal number of diametrically opposed coils and load power is drawn from or fed into each channel unequally, symmetrical dc voltage ripple and minimization of dc circulating currents is still achieved within each channel. Despite the unbalanced circuit operation, electromagnetic symmetry is substantially maintained and unbalanced magnetic pull will not result. However, the voltage ripple between the first and second dc load terminals will no longer be equal in magnitude to, or in phase with, the voltage ripple between the third and fourth dc load terminals. Harmonic circulating currents of order $2 \times C \times P$ flow in the parallel connected dc circuits where P is an odd number and C is an integer. The magnitude of these harmonic currents and dc circulating current is acceptably small for machines with a large number of armature phases (e.g. P>70). In the event of a failure mode that prevents a coil voltage from being rectified or inverted, thereby limiting the voltage between dc terminals of a particular switching module to approximately zero, or a level that is sufficiently low to have the effect of being zero, then harmonic circulating currents of order 2×C×Fs flow in the parallel dc circuits where C is an integer and Fs is the stator fundamental frequency. However, once again, the magnitude of these harmonic currents and dc circulating current for asymmetric failure modes is acceptably small for machines with a large number of armature phases (e.g. P>70). The effect of multiple instances of such failure modes is also acceptable when a machine has a large number of armature phases (e.g. P>70) even though this inevitably causes some degradation of performance.

According to embodiments of the present invention, each switching module can include an H-bridge with ac terminals and dc terminals. The ac terminals are connected to the ac terminals of the corresponding coil. The dc terminals of a plurality of H-bridges are connected together in series to define a dc circuit.

According to embodiments of the present invention, the switching modules can be controlled by a suitable control system. For example, each switching module can be associated with a corresponding controller.

According to embodiments of the present invention, each switching module can optionally include a commutation energy recovery circuit, optionally having an energy storage capacitor. Each energy recovery circuit can be connected to the dc terminals and the ac terminals of the corresponding H-bridge. An energy recovery circuit is only required when H-bridges operate as current source inverters that employ gate controlled power electronic devices to interrupt coil current when the commutating inductance is above a threshold that would render the dissipation of commutation energy unacceptable to either total system efficiency or cooling system design.

According to embodiments of the present invention, each H-bridge can include four power electronic devices arranged in a conventional manner and is, in an embodiment, configured as a current source converter but optionally as a voltage source converter. Any suitable power electronic devices can be used, including diodes and thyristors, and their functional equivalents, and devices that can be turned on and off by gate control. Since many switching modules are connected together in series their dc terminals inherently carry the same substantially constant dc current with superimposed ripple components, thereby facilitating operation as current source converters. But it is equally possible to operate each H-bridge as a voltage source converter by the incorporation of a dc link capacitor. Also, since many switching modules are connected together in series it is desirable to employ power electronic devices with particularly low forward voltage drop and therefore majority carrier and unipolar topologies are employed in certain embodiments. These devices must be reverse blocking types when an H-bridge is configured as a current source converter and may be asymmetric types with inverse parallel connected freewheel diodes or reverse conducting types when an H-bridge is configured as a voltage source converter. Examples of such reverse blocking devices would include diodes, static induction transistor (SIT) derivatives, thyristors, reverse blocking and back to back vertical junction field effect transistors (VJFETs), and back to back metal-oxide-semiconductor field-effect transistors (MOSFETs), reverse blocking insulated gate bipolar junction transistors (RB-IGBTs), symmetrical gate turn off thyristors (GTOs) and symmetrical gate commutated thyristors (SGCTs). Examples of such asymmetric devices would include vertical junction field effect transistors (VJFETs), metal oxide semiconductor field effect transistors (MOSFETs), insulated gate bipolar junction transistors (IGBTs), gate turn off thyristors (GTOs) and gate commutated thyristors (GCTs). These asymmetric devices will generally be accompanied by a discrete inverse parallel connected diode but it is possible to monolithically or otherwise integrate the inverse parallel connected diode within the asymmetric device package in order to form a reverse conducting variant. Power electronic devices employing wide bandgap materials such as silicon carbide can be used because of their ability to operate at relatively high temperatures and more particularly would be beneficial since they can operate a junction temperatures that are in excess of the temperatures that are encountered in armature windings, but silicon-based devices can be used in air- and liquid-cooled arrangements providing the working fluid coolant is at a sufficiently low temperature. In an embodiment, the majority of the failure modes of the power electronic devices result in the development of a stable low resistance state wherein the ability to carry rated dc circuit current continuously and overload currents briefly is attained by the device without rupture or excessive dissipation. Pressure contact power semiconductor devices are therefore employed in embodiments of the present invention. But these need not be housed in conventional 'press pack' configurations, nor need they be assembled with a high compressive pressure, i.e. the use of a pressure contact system is associated only with the attainment of the desired low resistance fault state. Gate drive signals can be provided to each switching module from the associated controller. The gate drive signals can be used to control the switching of the power electronic devices in the H-bridge and also to control any power electronic device(s) that might be associated with the energy recovery circuit, for example. Switching aid networks (snubbers) can be used to limit switching losses in the power electronic devices.

According to embodiments of the present invention, the use of diodes and other power semiconductor power topologies that operate as a diode (e.g. the SIT) is particularly beneficial in the case where absolute simplicity and reliability of the power electronic switching assembly is a requirement. In this case, the control system for the power electronic switching assembly is not required to have any function with respect to commutation of the electrical machine and no energy recovery circuits are required. When diodes or their functional equivalents are employed, natural commutation occurs within the H-bridge and the associated coil and the H-bridge operates as a current source converter. Such an electrical machine could only be used in a generating mode and would have no ability to limit dc fault current or any consequential shaft torque overload or demagnetisation of permanent magnet excitation if used. Since the maximum off load dc terminal voltage of the electrical machine varies approximately pro rata with shaft speed, and loaded dc terminal voltage is subject to load current and commutation inductance dependent voltage drop, such electrical machines are, in an embodiment, connected to an external circuit by means of a power converter whose function is to maintain output power quality. This power converter, which can be of any suitable type, can be adapted to limit dc terminal fault current and torque since the power electronic switching assembly has no inherent ability to provide this protection function.

According to embodiments of the present invention, the use of thyristors may also be beneficial in the case where simplicity and reliability of the power electronic switching assembly is a requirement. In this case, the control system for the power electronic switching assembly is required to control the commutation of the electrical machine and no energy recovery circuits are required. When thyristors are employed, natural commutation occurs within the H-bridges and the associated coil and the H-bridges operate as current source converters. Such an electrical machine would only be fully effective when used in a generating mode where the H-bridges operate as naturally commutated rectifiers and would have a rate-limited ability to limit dc fault current and any consequential shaft torque overload and demagnetisation of permanent magnet excitation if used. Since the maximum off load dc terminal voltage of the electrical machine varies approximately pro rata with shaft speed, and loaded dc terminal voltage is subject to load current and commutation inductance dependent voltage drop, such electrical machines are, in an embodiment, connected to an external circuit by means of a power converter whose function is to maintain output power quality. This power converter, which can be of any suitable type, can be adapted to further limit dc terminal fault current and torque. Such a machine would have only a limited ability to operate in motoring mode as a result of the effect of commutating inductance upon natural commutation where the H-bridges operate as current source converters in inverting mode. The external power converter can be adapted to interrupt the dc current that is fed to the power electronic switching assembly when motoring to effect low speed dc line commutation, thereby permitting a machine whose primary function is generation to operate as a motor at very low speed (<0.05 pu) for shaft positioning, 'baring' and commissioning purposes.

According to embodiments of the present invention, if the switching modules use power electronic devices that can be turned on and off by gate control then the power electronic switching assembly can be controlled to provide forced commutation of the electrical machine. The electrical machine can be used in both generating and motoring modes. The power electronic devices of the switching modules can also be controlled to provide a protection function to limit dc terminal fault current etc.

According to embodiments of the present invention, the power electronic devices are able to operate at high temperatures with low conduction losses, optionally so that the switching modules can be cooled by the air cooling circuits of the electrical machine without adversely affecting its air cooling circuit design or compromising the reliability of the power electronic devices.

According to embodiments of the present invention, the power electronic devices can also be cooled by being placed in pressure contact with the respective armature coil overhang using a suitable thermally conductive and electrically insulating interface, thereby allowing the coil to act as a heatsink. The power electronic devices can also be cooled by a liquid cooling circuit which might contain a dielectric liquid, e.g. a proprietary transformer insulating fluid such as MIDEL and its equivalents, or NOVEK which has a suitable boiling point and can provide the high heat flux density benefit of phase change cooling. In an embodiment, the switching modules can be air insulated and capable of operating at the maximum coil temperature which is about <150° C.

According to embodiments of the present invention, the power electronic switching assembly can be adapted to provide gradual degradation of performance as a result of successive failures of individual switching module components. For example, following a control system failure that affects a particular switching module, the corresponding coil can be left open circuit whilst the dc link current bypasses the coil by selecting a suitable switching state for the power electronic devices—either of the fourth and fifth switching states described below in the context of a current source converter with gate controlled reverse blocking power semiconductor switching devices and with reference to FIG. 8 would be suitable. The same switching states may be employed by a voltage source inverter and this aspect of adaptation to provide gradual degradation of performance is described below with reference to FIG. 11. Moreover, it is possible that some switching module failure modes and the failure modes of the power electronic devices may lead to the development of a low resistance state, gate controlled or otherwise, in any or all of the power electronic devices within one or more switching modules and this may result in one or more coils carrying fault current and producing fault torque and exposing permanent magnet excitation systems (when used) to risk of demagnetisation. Under these circumstances it may be possible to employ a fusible device or other switching device to interrupt individual coil fault currents, it being the case that individual coil currents and voltages attain only moderate levels. The effect of single and multiple instances of such failure modes would lead to asymmetric operation of the machine, this being acceptable when the number of armature phases P is large (e.g. P>70) but it is inevitable in these cases that some degradation of performance occurs. Moreover, some control system tolerancing limitations and failure modes may lead to asymmetric operation of the machine, e.g. individual coils may operate at power factors that deviate slightly from the norm. Once again, this is acceptable if the machine has a large number of armature phases (e.g. P>70) but it is inevitable in these cases that some degradation of performance occurs.

According to embodiments of the present invention, connecting the dc terminals of the switching modules together in series to define two parallel current paths allows a high dc terminal voltage to be developed. However, it will be readily appreciated that the current flowing through each switching module will be relatively low and so the size, rating and cost of the power electronic devices can be minimized. For example a typical force commutated 5 MW generator with 180 single-layer coils, each having a modulus of ac terminal open circuit voltage of 220V mean and an approximate rms current rating of 150A might be configured with two parallel dc circuits to deliver 18 kV dc at about 280A at the dc load terminals of the power electronic switching assembly. It will be understood that such an example is provided for illustrative purposes only and that allowance must be made for the effects of non-sinusoidal operation, commutating inductance and energy recovery etc. on the force commutation process.

According to embodiments of the present invention, the interconnections between the switching modules and between the switching modules and their associated coils can be short and direct. Optionally, a number of switching modules can be interconnected and combined in an assembly with two local dc terminals. Optionally, any convenient number of switching modules can be interconnected and combined in a sub-assembly and any convenient number of sub-assemblies can be combined to form an assembly with two local dc terminals. The interconnections between switching modules may be such that their respective H-bridge dc terminal voltages are summated and/or that their combined dc voltage is in either polarity with respect to rotation about the armature. The switching modules can be distributed circumferentially around the armature or stator assembly on or near to the coil endwinding overhangs.

According embodiments of the present invention, both the circumferential distribution of the air gap flux density and the coil currents are non-sinusoidal and include low order integer harmonics. The air gap flux density and coil currents can be synchronised such that the fundamental and low order integer harmonic components of armature magneto-motive force (mmf) and air gap flux have a substantially quadrature relationship in order to maximize torque per unit armature current and to maximize torque density.

According to embodiments of the present invention, the electrical machine may use any convenient form of field excitation. For example, the field poles can be defined by permanent magnet poles arranged around the rotor, either surface mounted or embedded, superconducting field windings or bulk superconducting magnets, conventional copper or aluminium field windings etc. The electrical machine can be of any suitable type such as induction, synchronous etc. and have any suitable rotor and armature construction such as iron-core, iron-core with large toothless air gap, non-iron or air-core etc. The use of a superconducting rotor having an electromagnetic shield in conjunction with an air gap type armature winding having a large magnetic air gap between rotor and stator back iron would be beneficial in allowing commutating inductance to be minimized to the point where naturally commutated switching modules would be preferred, whilst eliminating the requirement for the in-slot region of stator coil main wall insulation. Such an electrical machine would instead require equivalent main wall insulation in the form of a discharge-free cylinder between the stator coil array and the stator back iron. The benefits of embodiments of the present invention would be fully applicable to this insulation system and as such the armature coils would require only a low voltage insulation system, i.e. individual coils would not require main wall insulation. Although such a machine would not have magnetic teeth or slot features in its stator iron, the use of the term 'slot(s)' herein will be fully understood to define the cross sectional outline of the stacked coil side(s) of a two-layer or single-layer coil, or the side-by-side coil sides of a tooth concentrated winding. Hence the term 'slot(s)' is fully applicable to both slotted and non-slotted armatures.

According to embodiments of the present invention, the electrical machine may use any convenient mechanical topology, e.g. radial flux with rotor inside stator, radial flux with rotor outside stator, single disc axial flux and multiple disc axial flux.

According to embodiments of the present invention, the electrical machine will operate at a relatively low speed. For example, a large direct drive permanent magnet generator might have a maximum speed of less than 15 rpm whereas other large machines might have a maximum speed of less than 200 rpm.

According to embodiments of the present invention, the electrical machine can be a low speed (e.g. direct drive) permanent magnet generator for use in a wind turbine, optionally where Np>80, Ns>200 and δ<<1.

According to embodiments of the present invention, the electrical machine can be a low speed, high power propulsion motor, optionally where Np>8, Ns>120 and δ<<1. It is expected that significant technical benefits can be obtained when Np=12, Ns=150 and δ=0.5.

DETAILED DESCRIPTION OF THE INVENTION

Figure 1:
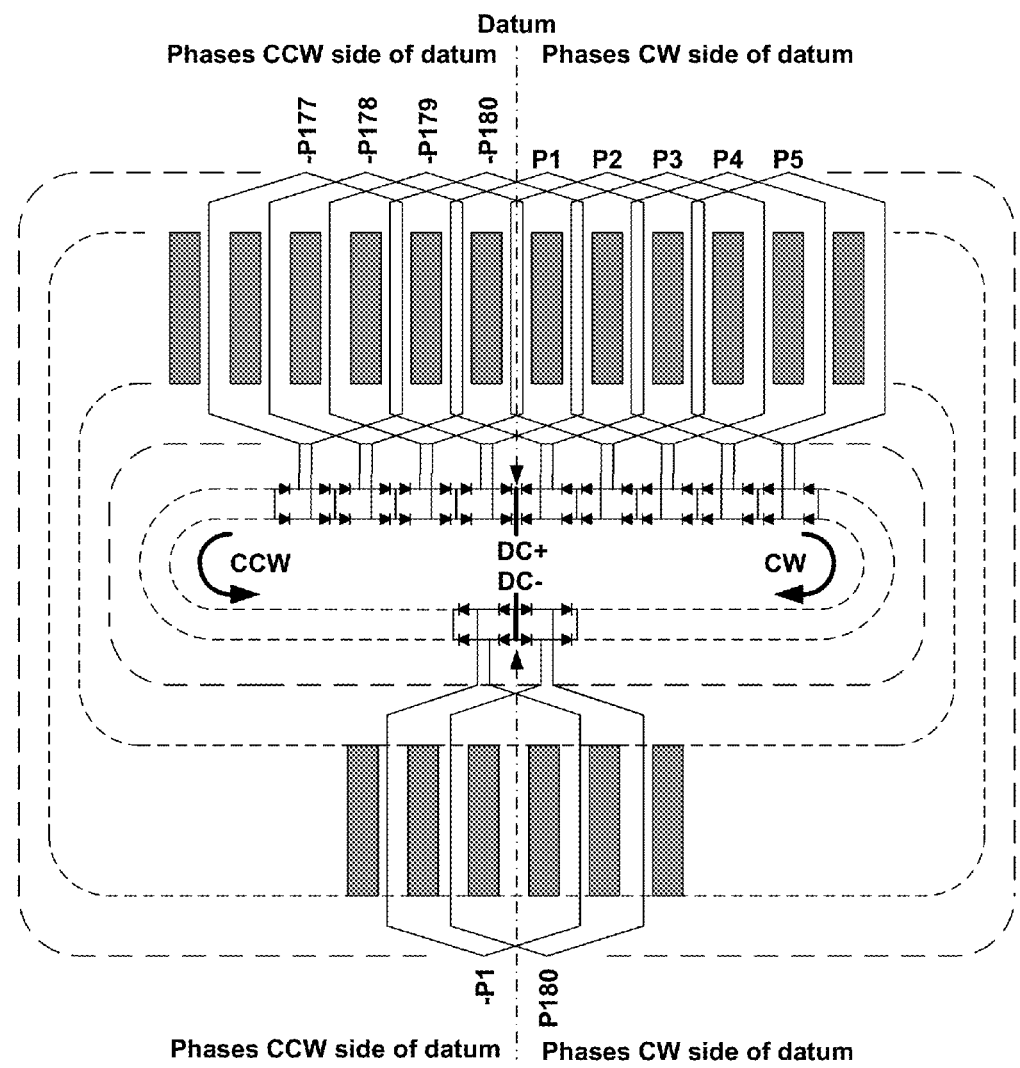
FIG. 1 is a schematic diagram showing a dc electrical machine according to an embodiment of the present invention with two-layer coils.
Figure 2:
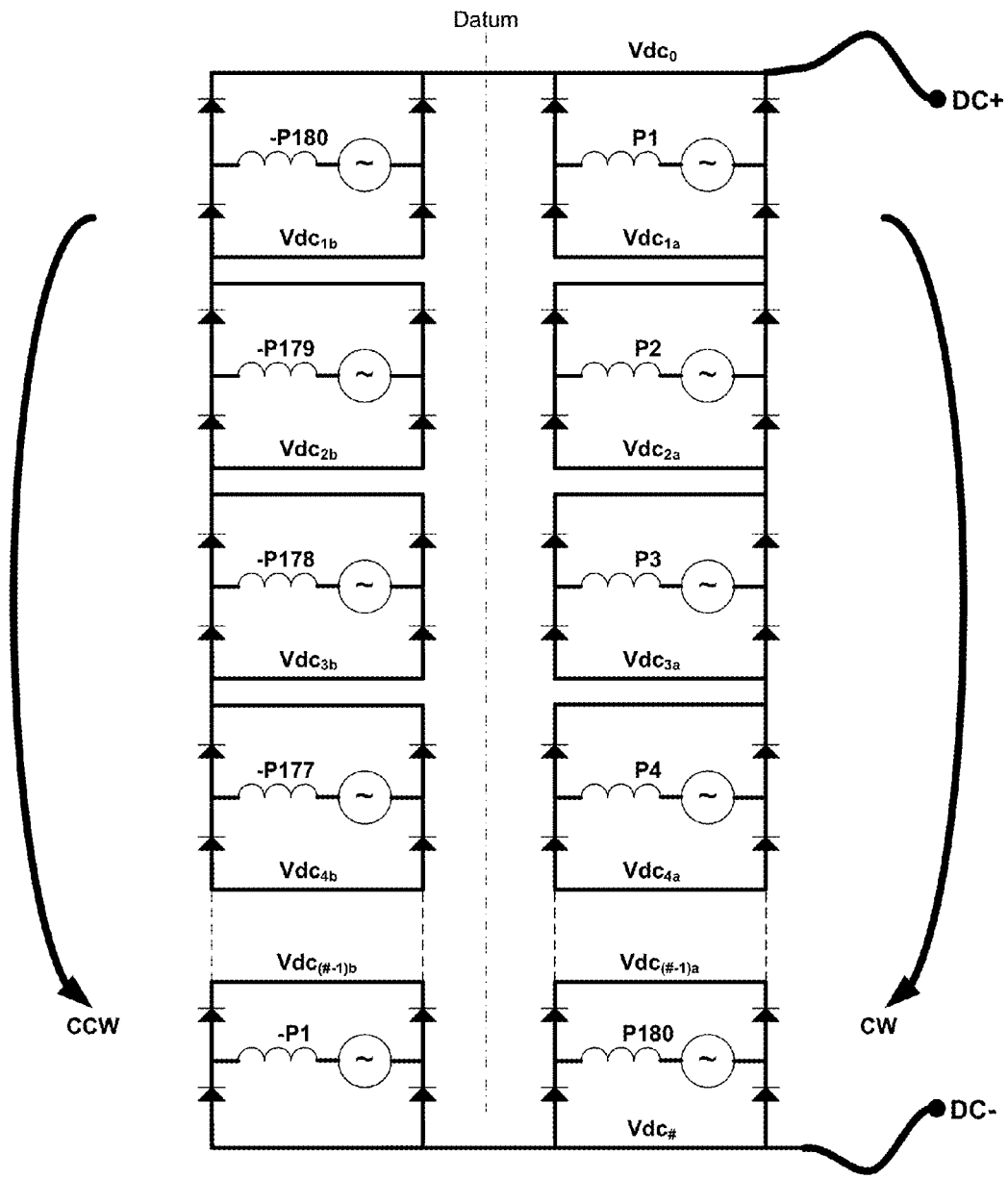
FIG. 2 is a schematic diagram showing the interconnection of the switching modules for a dc electrical machine according to an embodiment of the present invention as illustrated in FIG. 1.
Figure 3:
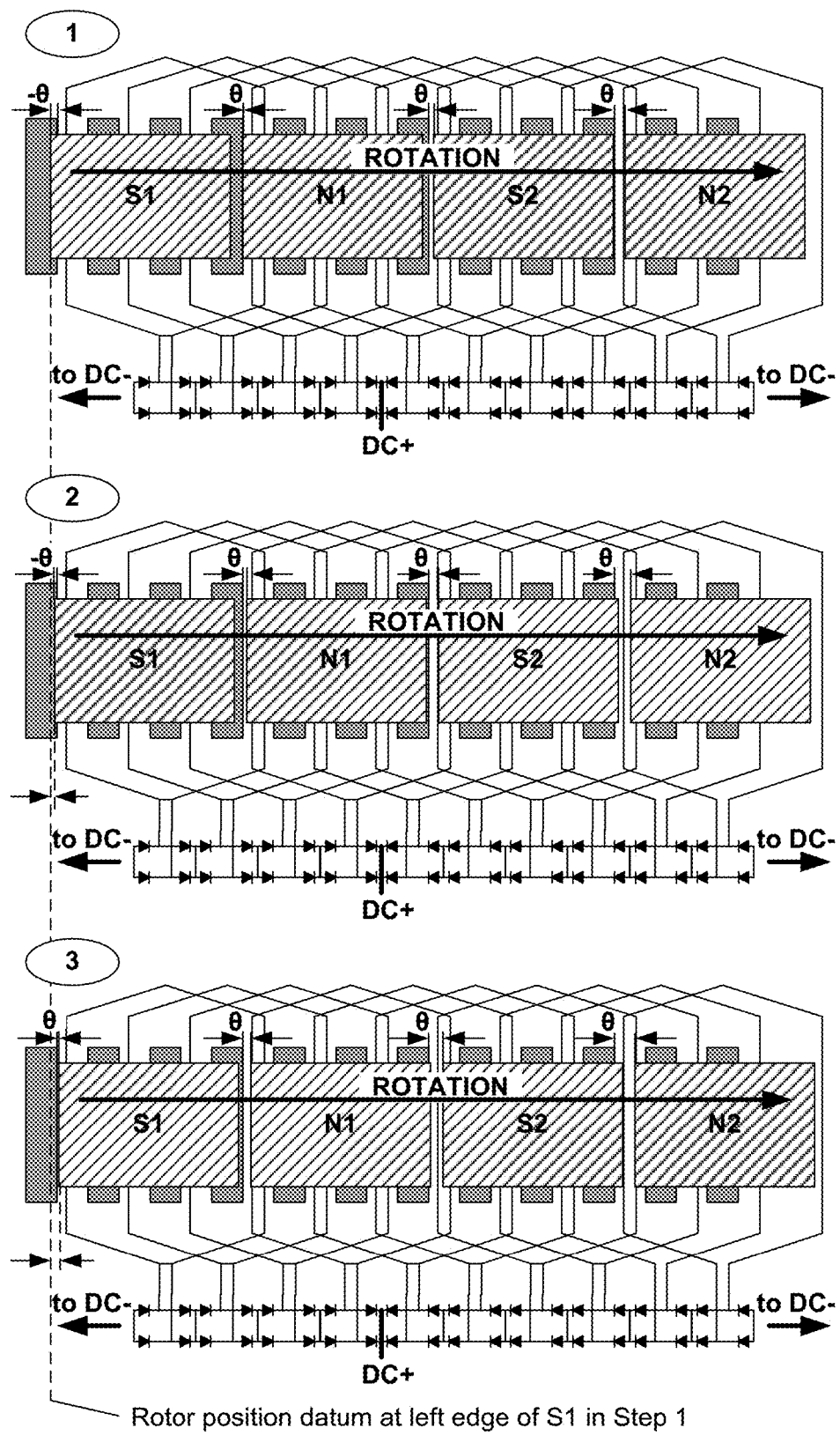
FIG. 3 is a schematic diagram showing rotor positions of a dc electrical machine according to an embodiment of the present invention as illustrated in FIG. 1.

A dc electrical machine according to an embodiment of the present invention is shown schematically in FIGS. 1, 2, and 3. A dc electrical machine according to an embodiment of the present invention is shown schematically in FIGS. 4, 5, and 6. It will be readily appreciated that the rotor and much of the stator have been omitted from FIGS. 1 and 4 for clarity.

In embodiments, the stator (or armature) assembly of the electrical machine has 360 winding slots (Ns=360) for receiving the coils of the stator winding. In an embodiment, the stator winding includes 360 two-layer coils. In an embodiment, the stator winding includes 180 single-layer coils. Although not shown, the stator could have an odd number of winding slots or a tooth concentrated winding where each coil is wound around a stator tooth.

According to an embodiment, a datum is provided by the co-located local positive dc terminals $Vdc_o$ of first and second segments (corresponding to first and second dc circuits) of a power electronic switching assembly which is described in more detail below. The co-located local negative dc terminals $Vdc_{\#}$ of the first and second segments are located 180 mechanical degrees about the stator circumference from the local positive dc terminals $Vdc_o$. The local positive dc terminals $Vdc_o$ are connected to one another and to a first dc load terminal (positive load terminal DC+) of the power electronic switching assembly. The local negative dc terminals $Vdc_\#$ are connected to one another and to a second dc load terminal (negative load terminal DC−) of the power electronic switching assembly. The first and second dc load terminals can be connected to any suitable external equipment or circuit (not shown), optionally by means of an interposing power converter (not shown). In the case of a generator such as a direct drive permanent magnet generator for a wind turbine then the external circuit can be a collection network that provides power from the generator to a utility grid. In the case of a motor such as a propulsion motor for a marine power distribution and propulsion system then the external circuit can be a connection to a busbar or switchboard, for example.

Figure 4:
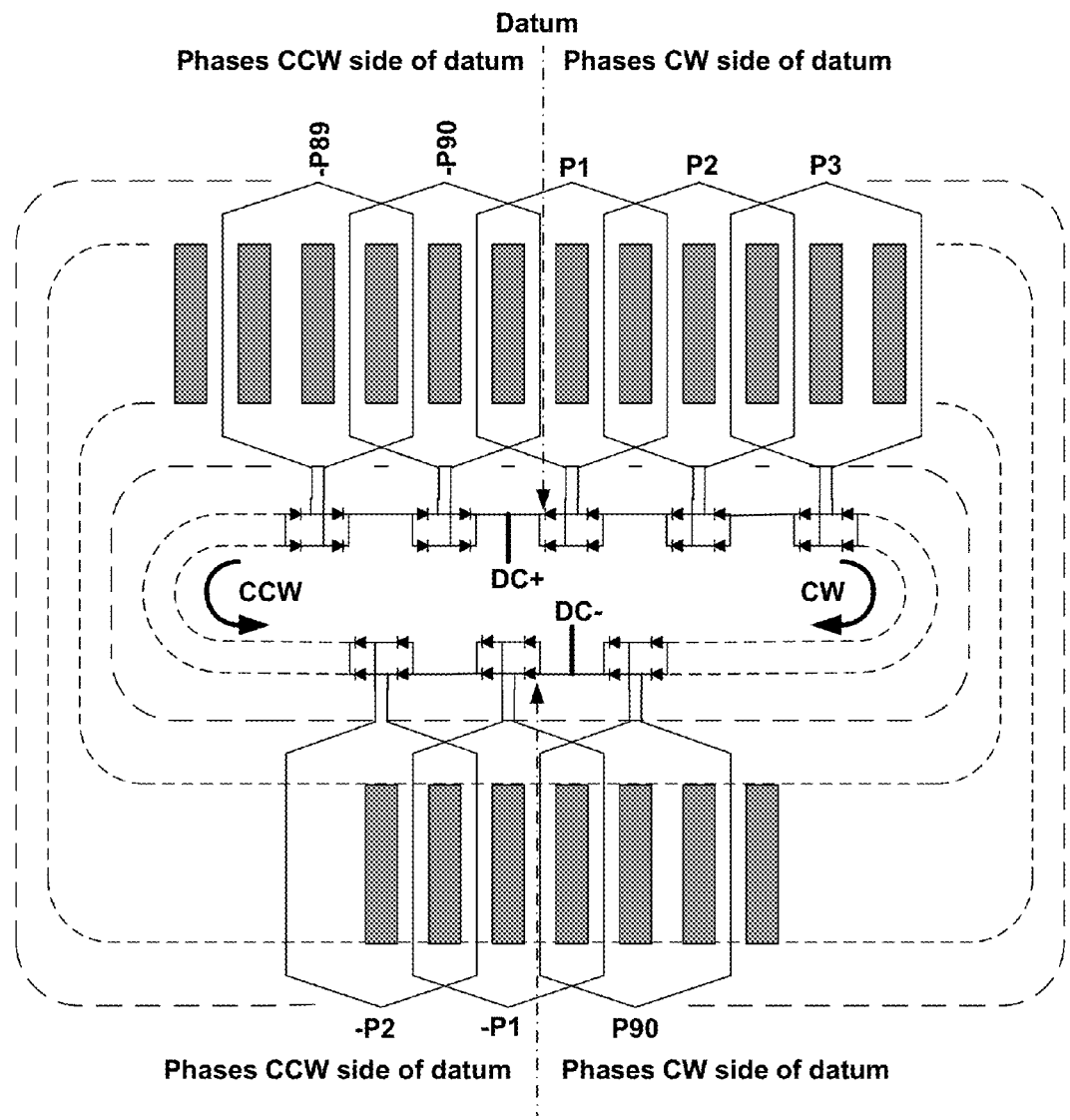
FIG. 4 is a schematic diagram showing a dc electrical machine according to an embodiment of the present invention with single-layer coils.

According to an embodiment as illustrated in FIG. 1, half of the total number of coils running in a clockwise (CW) direction from the datum have been labelled with phase numbers P1, P2, P3, P4, P5 . . . P180 while the remaining coils running in a counter-clockwise (CCW) direction from the datum have been labelled with phase numbers −P180, −P179, −P178, −P177 . . . −P1. In an embodiment as shown in FIG. 4, half of the total number of coils running in a clockwise direction from the datum have been labelled with phase numbers P1, P2, P3 . . . P90 while the remaining coils running in a counter-clockwise direction from the datum have been labelled with phase numbers −P90, −P89 . . . −P2, −P1.

According to an embodiment, the ac terminals of each coil are connected to the ac terminals of an associated switching module. Each switching module includes a conventional H-bridge with four diodes. In an embodiment as shown in FIG. 1, the dc terminals of the H-bridges for the coils that define phases P1 . . . P180 are connected in series between the first and second dc load terminals DC+, DC− to define a first dc circuit. The dc terminals of the H-bridges for the coils that define phases −P1 . . . −P180 are connected in series between the first and second dc load terminals DC+, DC− to define a second dc circuit. In an embodiment as shown in FIG. 4, the dc terminals of the H-bridges for the coils that define phases P1 . . . P90 are connected in series between the first and second dc load terminals DC+, DC− to define a first dc circuit. The dc terminals of the H-bridges for the coils that define phases −P1 . . . −P90 are connected in series between the first and second dc load terminals DC+, DC− to define a second dc circuit. The first and second dc circuits are therefore connected in parallel between the first and second dc load terminals. Put another way, the power electronic switching assembly is partitioned into a first segment that includes the switching modules that are interconnected to define the first dc circuit and a second segment that includes the switching modules that are interconnected to define the second dc circuit. The embodiments shown in FIGS. 1 and 4 therefore have the arrangement (or 'benchmark') with symmetrical dc circuits as described briefly above. It will be readily appreciated that in other arrangements additional dc circuits can be connected in parallel between the first and second dc load terminals. For example, single channel machines may have four parallel connected dc circuits between the first and second dc load terminals providing their number of coils is divisible by four to yield an integer, or dual channel machines may have a third dc load terminal (positive load terminal) and a fourth dc load terminal (negative load terminal) with additional dc circuits connected in parallel between the third and fourth dc load terminals. Asymmetrical dc circuit arrangements (i.e. where the parallel dc circuits or segments have a different number of H-bridges) are also possible.

According to an embodiment, the output of each coil is rectified by the corresponding H-bridge as described in more detail below.

According to an embodiment as shown in FIG. 1, a mean light load dc terminal voltage Vdc is given by: $Vdc = (Ns/2 \times |Vc|avg) - (Ns \times Vdiode)$, where $|Vc|$ is the modulus of the coil voltage, avg is an averaging function, and Vdiode is the idealised voltage drop of a single rectifier diode. The dc terminal current Idc is divided between the parallel dc circuits whose respective dc currents are substantially Idc/2 and the coil currents are constrained to be ±Idc/2 except during commutation. The effects of natural commutation are significant when the machine is loaded and during the commutation overlap angle, whilst coil current commutates from +Idc/2 to Idc/2 at a rate set by Vc/Lc, where Vc is the coil instantaneous open circuit voltage and Lc is the commutating inductance, the coil terminals are effectively shorted, thus preventing the coil from delivering power to the load. It follows that the dc terminal voltage droops as the dc terminal current is increased and that the slope of the droop is approximately proportional to commutating inductance.

According to an embodiment as shown in FIG. 4, an electrical machine has half as many coils as the machine according to an embodiment shown in FIG. 1 and therefore the ratio of the dc terminal voltage Vdc and the coil voltage Vc is approximately half that of the machine according to an embodiment shown in FIG. 1. Since the single-layer coils of the electrical machine as shown in FIG. 4 occupy substantially the whole of the slot depth (as opposed to half the slot depth for the two-layer coils as shown in FIG. 1) the summated coil volt.amps of the complete stator may remain unchanged since the designer is free to trade coil turns for coil conductor strand cross-sectional area in order to arrive at the desired dc terminal voltage and current ratings. Broadly speaking, for embodiments designed to deliver the same dc terminal voltage with a given stator iron tooth and slot geometry, the coil of each coil of an embodiment with single-layer coils would employ twice as many turns as an embodiment employing two-layer coils whilst using substantially the same conductor strand dimensions. The inter-turn insulation within both types of coils would be comparable, there being substantially the same number of turns per square metre of slot cross-section and it being the case that inter-turn insulation thickness would be determined by mechanical forces, rather than voltage withstand. Although the use of two-layer coils would theoretically suffer from the disadvantage of requiring insulation barriers between upper and lower layers of adjacent coils in the same stator slot, the low inter-coil voltage according to embodiments of the present invention would in practice render such a disadvantage negligible in the context of the overall stator design.

According to an embodiment, the commutation inductance related voltage droop would be sufficiently unaffected by the choice of coil type in machines having identical dc terminal ratings because the same number of slot ampere turns must be commutated by the same slot voltage. In other words, the effect of the commutation inductance Lc being proportional to the (number of turns per coil) is negated by there being half as many coils to commutate and twice the voltage per coil to cause each commutation event. Given that embodiments of the present invention are of particular relevance to large machines whose coils, in an embodiment, could be pre-formed and relatively inflexible, the choice between two-layer or single-layer coils could be determined by ease of manufacture. In embodiments, larger machines (those with a stator with a diameter greater than 4 m) would employ single-layer coils because they are often easier to insert into the stator slots.

The interconnections between the coils and the H-bridges in the ac domain, and the interconnections between the dc terminals of the H-bridges in the dc domain, are more clearly shown in FIG. 2 according to an embodiment. Similar interconnections are shown according to an embodiment in FIG. 5.

Figure 6:
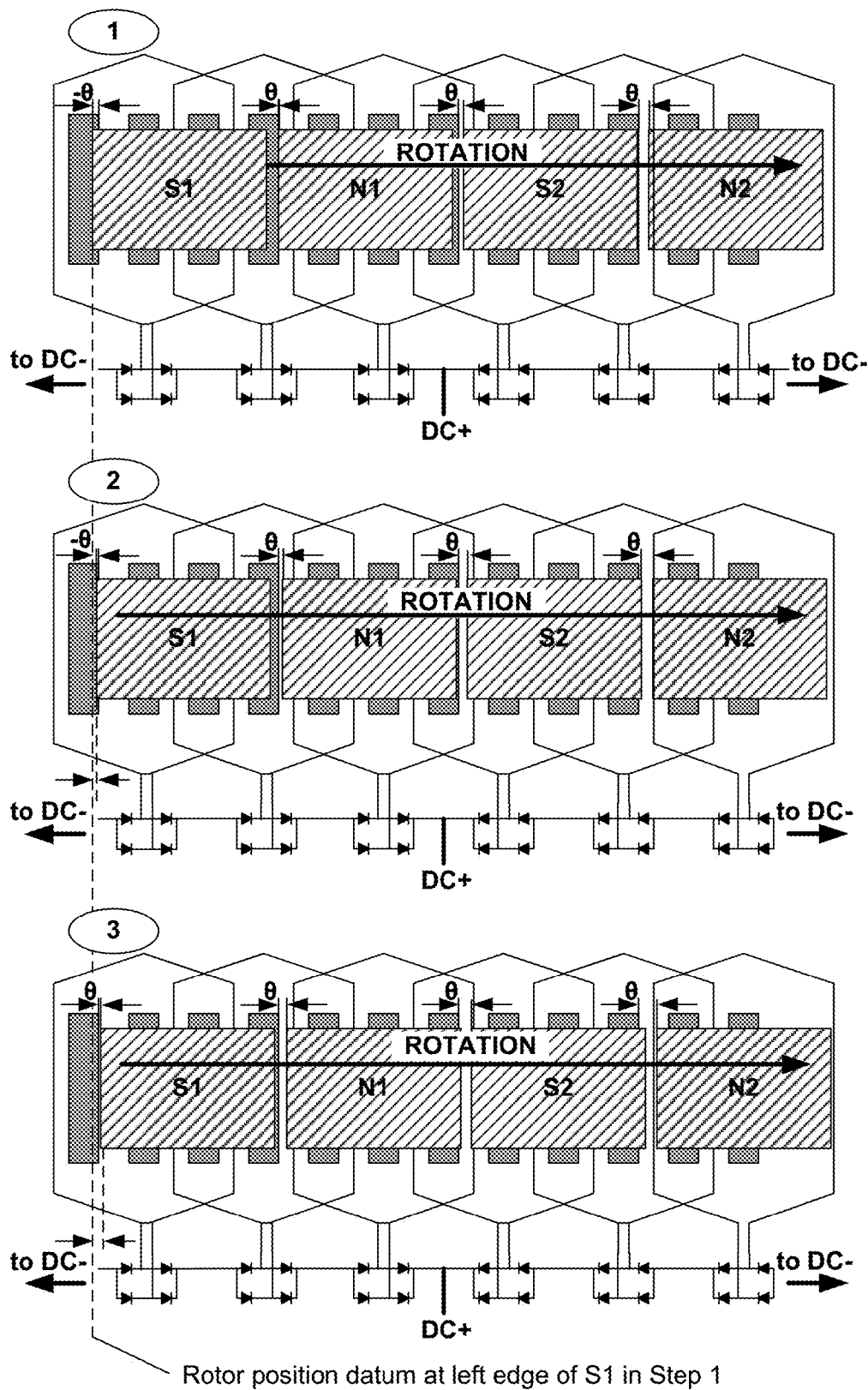
FIG. 6 is a schematic diagram showing rotor positions of a dc electrical machine according to an embodiment of the present invention as illustrated in FIG. 4.

The effect of providing a non-integer ratio for Np/Ns to provide a stator with many phases per slot per pole will be described with reference to FIGS. 3 and 6. FIG. 3 shows three positions of the rotor according to an embodiment with two-layer coils and FIG. 6 shows three corresponding positions of the rotor according to an embodiment with single-layer coils. Both rotors have 118 poles (Np=118) and Ns/Np=3.0508. In other words, the electrical machines have approximately, but not exactly, three slots per pole. If this is defined in terms of the vernier shift where Ns/Np=n+δ then it can be seen that n=3 and δ=0.0508.

According to embodiments, for a conventional dc electrical machine having 360 slots then the rotor could have 120 poles so that Np/Ns=3, thereby facilitating a three-phase stator interconnection. However, according to embodiments of the present invention, the number of poles has been reduced from 120 to 118. Both the electrical machines according to embodiments shown in FIGS. 1 and 4 therefore employ the methodology described above where m=1, but it will be readily appreciated that, in an embodiment, a methodology could also be used where the number of slots is increased or decreased relative to the number of slots that would be found in a conventional electrical machine for a given number of poles and which would provide an integer ratio of Ns/Np.

According to embodiments, the poles are evenly distributed around the circumference of the rotor. Each pole is defined by a permanent magnet, the magnets being arranged to define alternating north (N) and south (S) poles. Only four poles S1, N1, S2 and N2 are shown in FIGS. 3 and 6 for clarity.

According to embodiments, the rotation of the rotor relative to the stationary stator is depicted in linear form by stepwise movement of the rotor poles S1, N1, S2 and N2 to the right relative to both the stator teeth and a rotor position datum that is aligned with the left-hand edge of the first south pole Si when the rotor is in a first rotor position. It will be understood that the vernier shift δ has been scaled up in the interest of clarity and that each step in the depicted rotor movement is slightly greater than 50% of the scaled vernier shift.

According to embodiments, in a first rotor position the left-hand edge of the first north pole N1 is aligned with the right-hand edge of the nearest stator tooth. The left-hand edges of preceding poles are progressively displaced from the right-hand edge of the nearest tooth by multiples of -δ according to a standard vernier arrangement. The displacement between the left-hand edge of the respective pole and the right-hand edge of the nearest tooth is represented in FIG. 3 by −θ or θ depending on the polarity of the offset. In the case of the first north pole N1 then θ=0 because the left-hand edge of the pole and the right-hand edge of the tooth are aligned, in the case of the first south pole S1 then θ=−δ, in the case of the second south pole S2 then θ=δ, and in the case of the second north pole N2 then θ=2δ. Although not shown, the left-hand edge of a south pole that is displaced from the first north pole N1 by precisely half the circumference of the rotor (i.e. by 180 mechanical degrees) will also be aligned with the right-hand edge of the nearest stator tooth.

According to an embodiment, in a second rotor position the rotor has moved only slightly to the right relative to the stationary stator. The left-hand edge of the first north pole N1 is now displaced from the right-hand edge of the nearest stator tooth by a little more than δ/2, the left-hand edge of the first south pole S1 is now displaced from the right-hand edge of the nearest tooth by a little less than −δ/2, the left-hand edge of the second south pole S2 is now displaced from the right-hand edge of the nearest tooth by a little more than 3δ/2, and the left-hand edge of the second north pole N2 is now displaced from the right-hand edge of the nearest tooth by a little more than 5δ/2.

According to an embodiment, in a third rotor position the rotor has moved only slightly more to the right relative to the stationary stator. The left-hand edge of the first north pole N1 is now displaced from the right-hand edge of the nearest stator tooth by a little more than δ, the left-hand edge of the first south pole S1 is now displaced from the right-hand edge of the nearest tooth by a small fraction of δ, the left-hand edge of the second south pole S2 is now displaced from the right-hand edge of the nearest tooth by a little more than 2δ, and the left-hand edge of the second north pole N2 is now displaced from the right-hand edge of the nearest tooth by a little more than 3δ.

It can therefore be seen that although the rotor moves only slightly to the right between each successive rotor position, the phase sequence moves to the left at an appreciably greater rate. In the embodiment shown in FIG. 3, whilst the rotor moves from step 1 to step 3, or a little more than the vernier shift δ to the right, this being <20% of the slot pitch, the alignment between respective edges of rotor poles and stator teeth has moved to the left by approximately three times the slot pitch or approximately one pole pitch, i.e. at step 3 the left-hand edge of the first south pole S1 is approximately aligned with the right-hand edge of the nearest stator tooth. Therefore, it can be seen that while the rotor moves from step 1 to step 2, or a little more than δ/2 to the right, this being <10% of the slot pitch, the alignment between respective edges of rotor poles and stator teeth has moved to the left by approximately six times the slot pitch or approximately two pole pitches, i.e. at step 2 the left-hand edge of the north pole (not shown) immediately to the left of the first south pole S1 is approximately aligned with the right-hand edge of the nearest stator tooth. Since one cycle of phase sequence occupies two pole pitches, adjacent electrical phases in the phase sequence are physically separated by six stator slots, six coils and six electrical phases. Unlike a conventional electrical machine with an integer number of slots per pole and where the phase sequence of the armature winding is synchronous with rotor position and where adjacent coils are electrically consecutive phases, the vernier shift causes the electrically consecutive phases to be physically remote from each other, i.e. stator phase rotation is not directly synchronised with rotor rotation. Similarly, commutation events are not directly synchronised with rotor rotation. In the case of the embodiment shown in FIG. 3, the physical aspect of electrical phase rotation has >60 times the angular velocity of, and the opposite polarity to, the mechanical rotation of the rotor. Had the vernier shift been in the opposite polarity (e.g. causing regressive phase sequence) then the physical aspect of electrical phase rotation would also be in the opposite sense.

Figure 5:
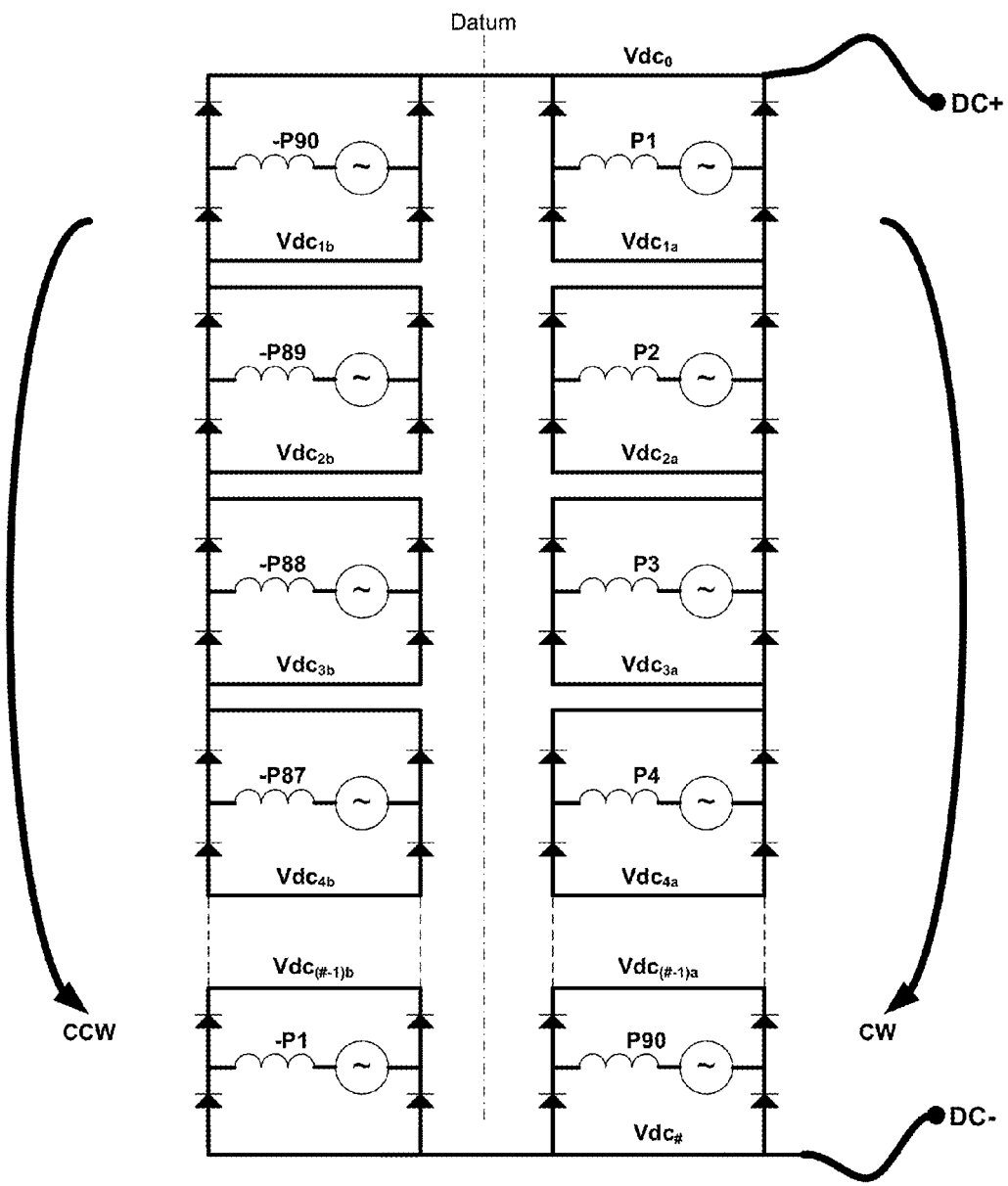
FIG. 5 is a schematic diagram showing the interconnection of the switching modules for a dc electrical machine according to an embodiment of the present invention as illustrated in FIG. 4.

According to an embodiment, the mechanical vernier relationship between the pole edges and the stator tooth edges of an embodiment shown in FIG. 5 is similar to an embodiment shown in FIG. 1, but the relationship between the electrical phase rotation and the mechanical rotation of the rotor is slightly different. In this case, for a rotor movement of approximately 10% of the slot pitch to the right, the alignment between respective edges of the poles and stator teeth moves to the left by approximately six times the slot pitch or approximately two pole pitches. Adjacent electrical phases in the phase sequence are physically separated by six slots, but are physically separated by only three coils and three electrical phases.

According to an embodiment, each coil is connected to an H-bridge switching module. Thus, an embodiment with two-layer coils has 360 switching modules and an embodiment with single-layer coils has 180 switching modules. The switching modules are disposed around the stator and are in close proximity with the coil endwinding overhangs at one end of the stator. As shown in FIGS. 2 and 5, a first series of switching modules (180 for an embodiment as illustrated in FIG. 2 or 90 for an embodiment as illustrated in FIG. 5) have ac terminals connected to the corresponding ac coil terminals and dc terminals connected together in series. A second series of switching modules (180 for an embodiment as illustrated in FIG. 2 or 90 for an embodiment as illustrated in FIG. 5) have ac terminals connected to the corresponding ac coil terminals and dc terminals connected together in series. The polarity of the dc connections between the first and second series of switching modules is such that the local dc terminals at the ends of each series may be connected together to form two parallel dc circuits. According to an embodiment as illustrated in FIG. 2, the 360 two-layer coils correspond to 360 stator phases with a first series of 180 stator phases with substantially equal phase separation and a second series of 180 stator phases with substantially equal phase separation but which are in exact anti-phase with the first series. The stator winding of the electrical machine as shown in FIG. 2 therefore defines 180 effective stator phases, the term 'effective phases' being used herein to define that the end to end dc voltage ripple across each parallel dc circuit includes 360 substantially equal ripple cycles per revolution of the rotor so that the two circuits can be connected in parallel with minimal circulating currents. In the case of an embodiment as shown in FIG. 5, then the 180 single-layer coils correspond to 180 stator phases with a first series of 90 stator phases with substantially equal phase separation and a second series of 90 stator phases with substantially equal phase separation but which are in exact anti-phase with the first series. According to an embodiment as shown in FIG. 2, the stator winding therefore defines 90 effective stator phases.

According to an embodiment, it is known that surface mounted permanent magnet rotors define a magnetic air gap length that is the sum of the physical air gap length and the radial thickness of the magnets. The electromagnetic symmetry of such electrical machines is substantially unaffected by rotor eccentricity as long as normal standards of manufacturing precision are employed. This electromagnetic symmetry must be carefully specified in order to avoid circulating currents, it being the case that the rotor axis eccentricity with respect to stator, and rotor eccentricity with respect to rotor axis, both cause the open circuit voltage of diametrically opposed coils to be slightly unbalanced.

According to an embodiment, the arrangement and operation of the switching modules when configured for operation as current source converters will now be described with reference to FIGS. 7 to 10.

Figure 7:
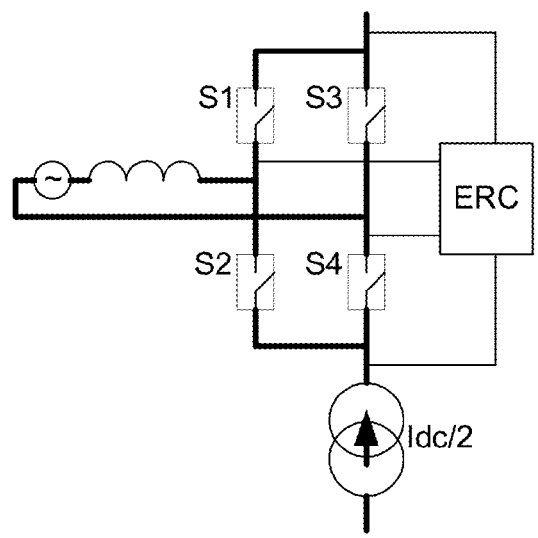
FIG. 7 shows the topology of a switching module according to an embodiment of the present invention.

According to an embodiment, each switching module includes an H-bridge with four power electronic devices S1 . . . S4. In the examples described above the power electronic devices are diodes and the electrical machine can only operate in a generating mode where the coil voltages are rectified by the switching modules. However, as shown in FIG. 7, in some arrangements the power electronic devices can be selectively turned on and off, e.g. by gate control. In this case the electrical machine can operate in both generating and motoring modes. In an embodiment, the power electronic devices are gate controlled reverse blocking devices with a low on state resistance, a high off state resistance, and low switching losses when switching between on and off states. In an embodiment, it is inherent that the switching frequency of power electronic devices S1 . . . S4 is equal to stator fundamental frequency when these are naturally commutated devices and, in an embodiment, the switching frequency of power electronic devices S1 . . . S4 is equal to stator fundamental frequency when these are force commutated or gate commutated devices. Stator fundamental frequency is particularly low (in an embodiment <20 Hz) in the low speed machines described herein and the associated low switching frequency is beneficial in rendering power semiconductor switching losses practically insignificant. In an embodiment, the power electronic devices are also capable of operating at a relatively high temperature, optionally in excess of the coil temperature experienced during operation of the electrical machine, and are sufficiently robust to withstand operation within the confines of the machine frame.

According to an embodiment, the ac terminals of each H-bridge are connected to the ac terminals of the corresponding coil, which is shown as a voltage source with a series connected inductance. The dc terminals of each H-bridge are connected to a dc link circuit which is shown as an equivalent current source Idc/2. It will be readily appreciated that the dc link circuit is the relevant current circuit between the first and second dc load terminals of the power electronic switching assembly.

According to an embodiment, each switching module can also include an energy recovery circuit that is connected to both the ac and dc terminals of the H-bridge. The energy recovery circuit can include an energy storage capacitor, power electronic devices and control circuitry that can be operated to receive dc link current and coil current when any one or more of the power electronic devices S1 . . . S4 are commutated and to return stored energy to the dc link circuit in the period between commutation events. Since the periods when commutation of an individual switching module takes place occupy a small proportion of the total operating time, the energy recovery circuit is best described as having a low impedance charging characteristic and a high impedance discharging characteristic. In an embodiment, the energy that is associated with commutating coil current is not dissipated since this could adversely affect efficiency and power losses. The energy recovery circuit therefore recovers energy that would otherwise be wastefully dissipated as heat.

According to an embodiment, the power electronic devices S1 . . . S4 can be selectively turned on and off to permit dc link current to be directed through the coil as required.

Figure 8:
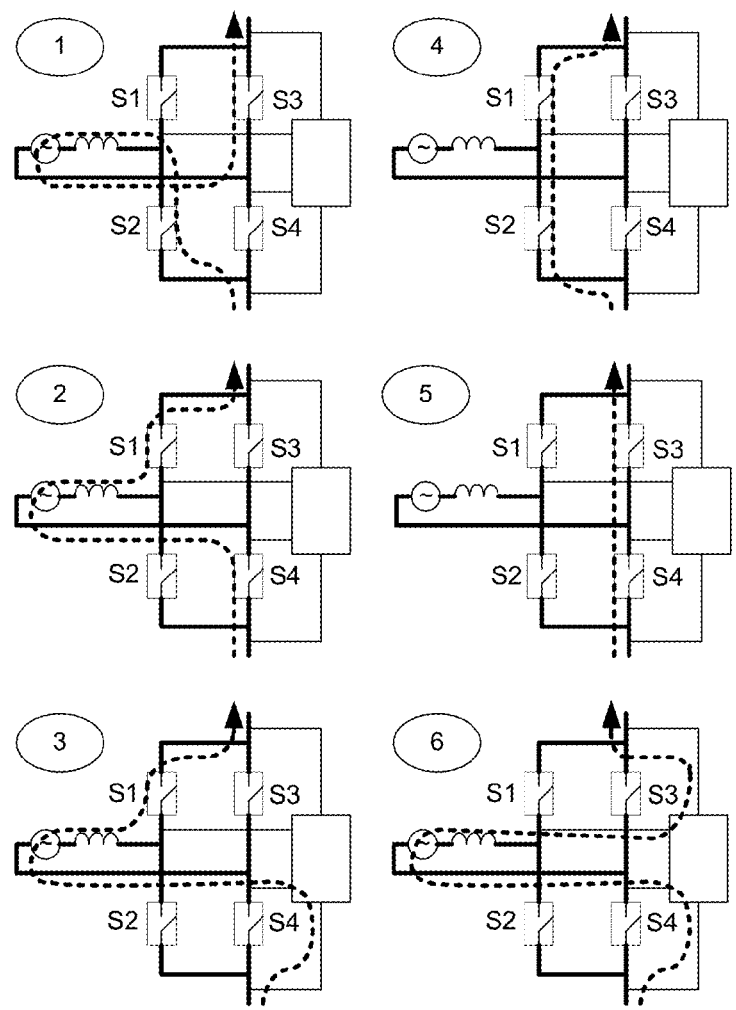
FIG. 8 shows various switching states that can be adopted by the switching module according to an embodiment of the present invention.

According to an embodiment, the various switching states of each H-bridge are shown in FIG. 8 in which the direction of current flow is represented by dashed arrows.

According to an embodiment, in a first switching state the dc link current is directed to flow from right to left through the corresponding coil by turning on power electronic devices S2 and S3 (i.e. switching these devices to the on state). Power electronic devices S1 and S4 remain in the off state.

According to an embodiment, in a second switching state the dc link current is directed to flow from left to right through the corresponding coil by turning on power electronic devices S1 and S4 (i.e. switching these devices to the on state). Power electronic devices S2 and S3 remain in the off state.

According to an embodiment, in a third switching state, which may follow the second switching state, the energy recovery circuit receives current from the dc link circuit and the coil as a result of commutation of power electronic device S4 (i.e. device S4 is switched from the on state to the off state while device S1 remains in the on state). Equivalent switching states (not shown) exist if the second switching state is interrupted by commutating power electronic device S1, or if the first switching state is interrupted by commutating one of the power electronic devices S2 and S3. In the third or an equivalent switching state the voltage Verc imposed on the coil by the energy recovery circuit is significantly in excess of the open circuit voltage of the coil Vc and so a forcing voltage of magnitude Verc-Vc is applied to the commutating inductance Lc. This causes the coil current Ic to change at a rate $dIc/dt = (Verc-Vc)/Lc$ which in turn causes commutation and eventual reversal of the coil current.

According to an embodiment, in a fourth or fifth state the dc link current is directed to flow through the H-bridge without flowing in the coil by turning on power electronic devices S1 and S2 or S3 and S4 respectively. The transition from the fourth state or the fifth state to the first state or the second state may be by natural commutation or forced commutation of the power electronic devices according to the polarity of the open circuit voltage of the coil Vc at the time of commutation. For example, the transition from the fourth state to the first state when the right-hand terminal of coil voltage is positive with respect to the left-hand terminal is achieved by turning on power electronic device S3 which causes current to naturally commutate from power electronic device S1 to power electronic device S3 at a rate that is determined by the open circuit voltage of the coil Vc and the commutating inductance Lc. The current in the coil correspondingly increases from zero until reverse recovery of power electronic device S1 occurs. The transition from the fourth state to the first state when the left-hand terminal of coil voltage is positive with respect to the right-hand terminal is achieved by turning on power electronic device S3 and commutating power electronic device S1 (i.e. device S1 is switched from the on state to the off state while device S3 is switched to the on state) which causes current to be force commutated from power electronic device S1 to power electronic device S3 at a rate $dIc/dt = (Verc-Vc)/Lc$ in an equivalent switching state (not shown) to the third switching state.

According to an embodiment, in a sixth switching state, which may follow the second switching state, the energy recovery circuit receives current from the dc link circuit and the coil as a result of commutation of power electronic devices S1 and S4 (i.e. devices S1 and S4 are switched from the on state to the off state). An equivalent switching state (not shown) exists if the first switching state is interrupted by commutating both of the power electronic devices S2 and S3. In the sixth or an equivalent switching state the voltage Verc imposed on the coil by the energy recovery circuit is significantly in excess of the open circuit voltage of the coil Vc and so a forcing voltage of magnitude Verc-Vc is applied to the commutating inductance Lc. This causes the coil current Ic to change at a rate $dIc/dt = (Verc-Vc)/Lc$ which in turn causes commutation and eventual reversal of the coil current.

According to an embodiment, the coil current is commutated so that it is either flowing in the correct direction or is set to zero before entering the above-defined first, second, fourth or fifth states.

Figure 9:
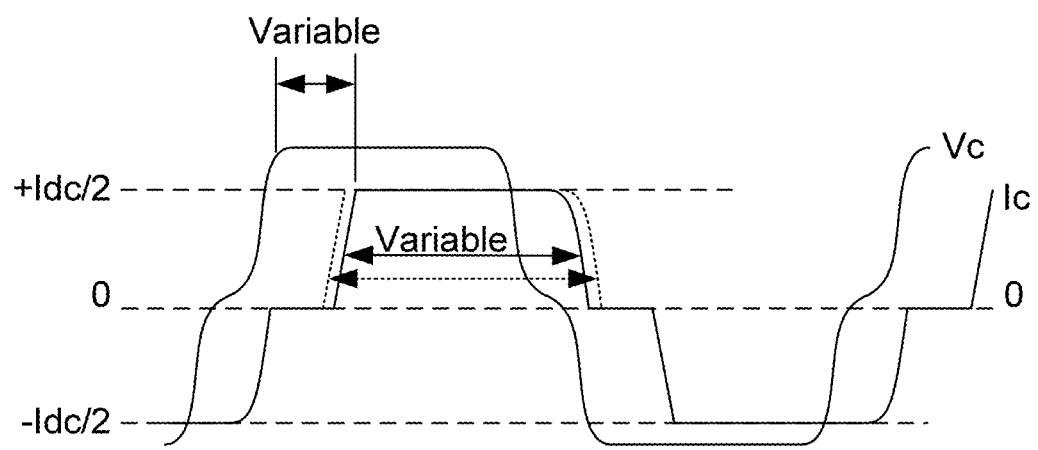
FIG. 9 shows the stator current waveform of a dc electrical machine according to embodiments of the present invention.

According to an embodiment, in the case of a machine having a power electronic switching assembly whose local dc terminals are connected to first and second dc load terminals that receive a dc current Idc and where that current is equally distributed between two parallel connected dc circuits, in a first case where energy recovery is neglected, the coil current can be controlled to produce waveforms of the form shown in FIG. 9 where the pulse width of a quasi-square current waveform is variable, as is the phasing of the current waveform with respect to the coil open circuit voltage waveform. The amplitude of the coil current is constrained to be approximately positive Idc/2 or negative Idc/2 at all times other than during commutations between the above-defined states and during periods where the fourth or fifth states are active. In a second case where energy recovery is taken into account, the amplitude of the coil current is broadly as defined for the first case but the current that flows out of the energy recovery circuit between commutations is subtracted from or summated with the modulus of coil current when generating and motoring respectively. It should be noted that the action of applying a forcing voltage to effect commutation causes the terminal voltage of the coil to be significantly distorted relative to the open circuit voltage of the coil Vc, i.e. the terminal voltage of the coil is only of the form shown for the open circuit voltage when no coil current flows. The gradient of the commutated 'edges' of current is affected by the nature of the energy recovery circuit and also the phase shift between the voltage and current.

According to an embodiment, the phase relationship between the voltage and current is shown for a machine in generating mode for the case where energy recovery is either insignificant or neglected for the purposes of illustration only and, although the waveforms show the case of a lagging power factor (pf<0.8 lag) in the interest of clarity, and in an embodiment, there is no phase shift between the fundamental components of the coil open circuit voltage and current waveforms in order to achieve the desired substantially quadrature relationship between stator mmf and air gap flux density. This maximizes torque per unit stator current at times when the electrical machine is expected to generate maximum output. In order for the fundamental components of the coil open circuit voltage and current waveforms to be in phase, i.e. at unity internal power factor, the coil current must be phase advanced relative to the coil terminal voltage, i.e. at a leading terminal power factor and hence forced commutation by means of the energy recovery circuit has been described. This specified quadrature relationship, in providing maximum torque per unit stator current, corresponds to the condition where the maximum dc terminal voltage is achieved for each switching module and between the first and second dc load terminals of the power electronic switching assembly of the electrical machine for any given shaft speed. Shaft power is therefore also maximized per unit shaft speed.

According to an embodiment, it will be readily appreciated that the phase relationship and pulse width could be varied for control and protection purposes and according to the required operating mode. More particularly, such a machine may be operated in motoring and generating modes in both directions of shaft rotation in order to achieve four quadrant drive capability and these modes may each be operated in forced commutation mode or natural commutation mode, subject to commutation inductance constraints. When operating in a motoring mode, the phase relationship is such that coil current is inverted relative to that shown in FIG. 9, i.e. coil current and coil open circuit voltage are approximately in antiphase and this phase relationship may be adjusted to maximize shaft torque per unit stator current by operating each coil at negative unity internal power factor. The phase shift is shown as being variable in FIG. 9 and in practice this variability is continuous in either direction over the full 360° range. At other times when operating in a generating mode, for example when the electrical machine is exposed to a low resistance or short circuit fault between the first and second dc load terminals, the output voltage and current of the electrical machine can be regulated by phase control, i.e. by adjusting the phase shift between the coil current and the coil open circuit voltage so that the electrical machine operates at a lagging or even zero power factor. Although phase control causes the electrical machine to operate at less than maximum torque per unit stator current, the ability to regulate its output can be beneficial to power system control and protection. The action of operating a generator at a lagging power factor causes the effect of armature reaction to beneficially contribute to fault current limitation behaviour. When operating at a lagging power factor each switching module can optionally be operated in a controlled manner in a naturally commutated mode that is equivalent to natural commutation in a single phase, phase controlled thyristor bridge rectifier. Even when force commutated power electronic switching devices are employed, the switching device turn off voltage stresses are minimized when operating in a natural commutation mode. Each switching module can also operate under controlled conditions that replicate the behaviour of a single phase diode bridge rectifier. The output of the machine may also be reduced for control and protection purposes by reducing the pulse width of coil current as described above and it may turned off by pulse suppression, i.e. by turning off all power electronic switching devices in each H-bridge or by selected either of the fourth and fifth states shown in FIG. 8.

According to an embodiment, in the case of a wind turbine generator, if the external collection network is subject to disruption and cannot receive power for a short period, e.g. 5 seconds, but it is undesirable to regulate torque production of the generator by blade pitch control, then a dynamic braking resistor may be connected between the first and second dc load terminals by suitable switching devices and the phase control means mentioned above can be used to allow the power dissipation in the braking resistor to be regulated in order to regulate the power extracted from the wind turbine for speed and/or torque control purposes.

According to an embodiment, the electrical machine can be designed to maximize the exploitation of non-sinusoidal air gap flux density and coil current harmonics. In principle, all low order integer harmonics may be disposed so as to contribute to mean torque and power but there may be practical upper limits to harmonic orders that can be exploited in this way. In some circumstances, particular harmonic orders in coil currents may be found to be counter-productive or at least to have little benefit and the pulse width of the quasi-square current waveform shown in FIG. 9 can be adjusted so as to beneficially adjust and optimise the harmonic spectra of current. Similarly, the effect of armature reaction upon air gap flux distribution and coil open circuit voltage may be more or less productive and the phase displacement between coil open circuit voltage and coil current shown in FIG. 9 can be adjusted so as to beneficially adjust and optimise the coil open circuit voltage and/or coil terminal voltage for any particular loading condition.

According to an embodiment, the natural commutation process will now be described with reference to FIG. 7 for the case where the power electronic devices are diodes. Prior to natural commutation the diodes 51 and S4 are conducting and current flows from left to right in the coil. H-bridge dc voltage output is equal to the coil open circuit voltage Vc. Natural commutation is initiated when the coil open circuit voltage Vc reverses thereby causing simultaneous conduction of diodes S1, S2, S3 and S4. The coil current Ic reduces at a rate set by Vc/Lc since the coil is effectively short circuited by the simultaneous conduction of the diodes. Current in diodes S2 and S3 (the incoming devices) increases at the same rate whilst current in diodes S1 and S4 (the outgoing devices) reduces at the same rate until the current in diodes 51 and S4 is commutated by reverse recovery of diodes S1 and S4 after momentarily reversing. Switching aid networks or snubbers can be used to moderate the diode switching transients. After natural commutation, the diodes S2 and S3 are conducting and current flows from right to left in the coil. H-bridge dc voltage output is equal to the coil open circuit voltage Vc. In the same way that the physical location of electrically adjacent phases does not follow physically consecutive coil locations, instead following a retrogressive or progressive sequence that is determined by the vernier shift, the commutation events are synchronous with the coil voltages and therefore follow the electrical phase sequence, i.e. the locations of consecutive commutation events follow the same retrogressive or progressive sequence.

According to an embodiment, the natural commutation process may also be applied to a configuration where the power electronic devices are thyristors. The only difference from the application of natural commutation where the power electronic devices are diodes is that the initiation of conduction of the incoming devices and the corresponding start of the commutation process of the outgoing devices may be delayed according to the above-described phase control process using gate control. While the phase lag in gate control is substantially less than 90° of fundamental frequency each H-bridge operates as a rectifier and the machine operates as a generator. At phase lags greater than 90° each H-bridge operates as an inverter and the machine operates as a motor. The physical locations of consecutive commutation events follow the above-described retrogressive or progressive sequence and are additionally subject to a physical phase shift according to the above-described phase control principle—the theoretically limiting physical phase shift range occupies one pole pitch to give 180° electrical phase shift. As previously described, inverting natural commutation is subject to the limitations imposed by commutating inductance and, in an embodiment, using dc line commutation would confine motor operation to very low speeds. It will be noted that a machine employing superconductor excitation with a rotor shield and an air gap type stator winding will have a particularly low commutating inductance and that this will be particularly beneficial to natural commutation. The use of naturally commutated thyristor technology is particularly beneficial in terms of its simple, robust nature and its control and protection capability. It will be appreciated that such a naturally commutated system has an inability to operate with coil terminal voltage and current at a leading power factor.

According to an embodiment, the forced commutation process is now described with reference to FIG. 10 and where the power electronic devices are gate controlled semiconductor devices depicted as switches. Each switching module also includes a simplified switching aid network with an energy recovery function that would be suitable for an electrical machine operating in a generating mode. The dc current that flows in the dc circuit is defined as a dc link current that is substantially unaffected by the commutation process that occurs in each switching module and is depicted as an ideal current source.

Figure 10:
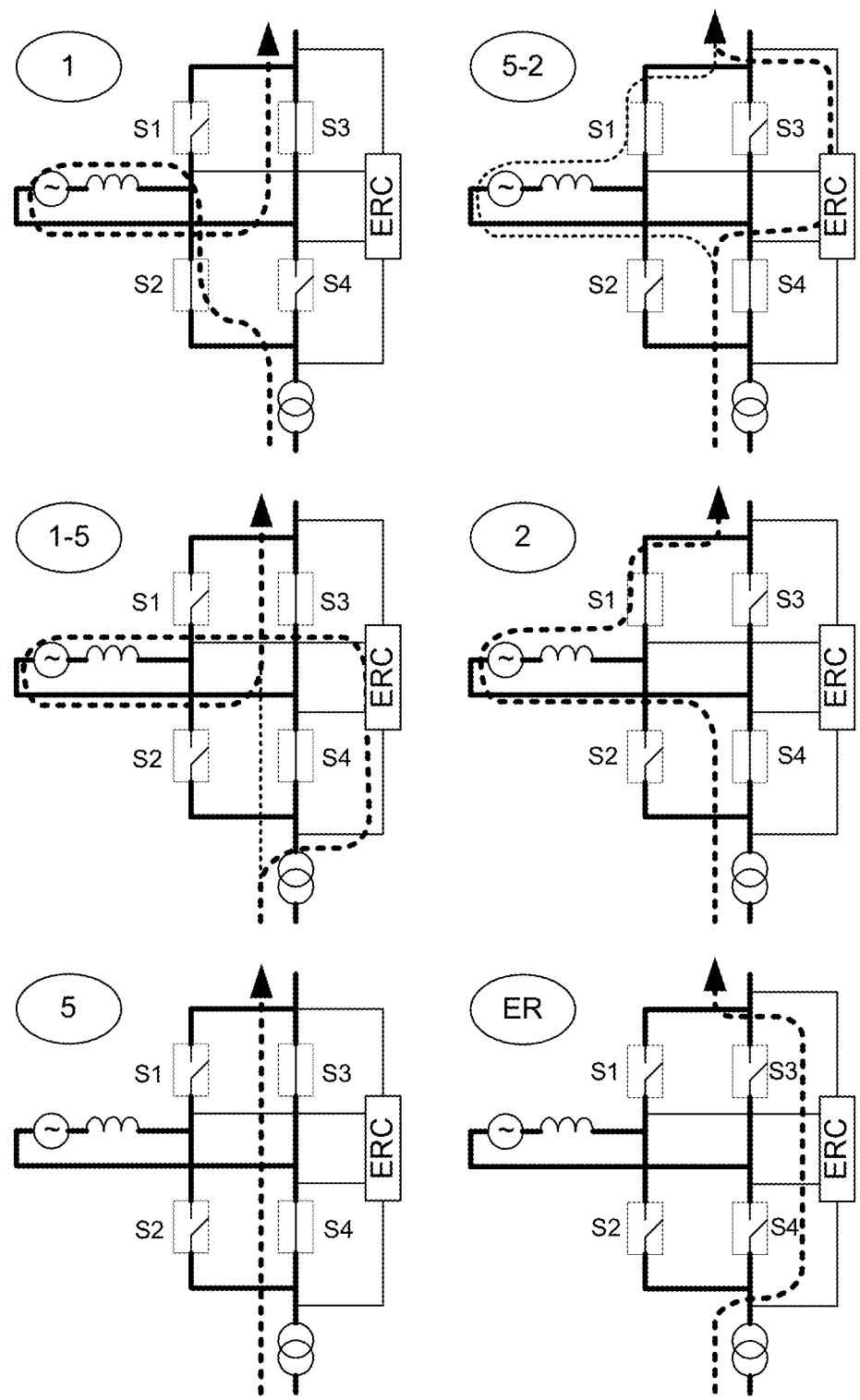
FIG. 10 shows the commutation sequence of a force commutation mode of a current source converter in accordance with the stator current waveforms according to an embodiment of the present invention as illustrated in FIG. 9.

According to an embodiment, the first, second and fifth switching states of FIG. 8 are replicated in FIG. 10 in the interest of clarity. The force commutated transition between the first and fifth switching states and between the fifth and second switching states are shown, together with an energy recovery state.

According to an embodiment, in the first switching state the power electronic devices S2 and S3 are turned on and dc link current is directed to flow from right to left through the corresponding coil. Power electronic devices S1 and S4 are in the off state.

According to an embodiment, to initiate forced commutation from the first switching state to the fifth switching state then power electronic device S2 is turned off by gate control while power electronic device S4 is turned on by gate control. The action of turning off power electronic device S2 causes the dc link current to rapidly divert through the energy recovery circuit (ERC) which is defined: (i) to present an impedance in parallel with power electronic device S2 that is sufficiently low to avoid excessive transient recovery voltage across device S2, (ii) to present a voltage that is significantly in excess of the open circuit coil voltage Vc and therefore is sufficient to cause force commutation of the coil current Ic, and (iii) to have a reverse recovery characteristic or other switching sequence that prevents unintentional reversal of the coil current Ic. In practice the energy recovery circuit can comprise a plurality of diode capacitor type voltage clamp circuits that are suitably defined to have a low stray inductance. As the coil current Ic reduces, the current in the energy recovery circuit correspondingly reduces whilst the current in power electronic device S4 correspondingly increases until reverse recovery of the energy recovery circuit interrupts the process and the fifth switching state is established. The outgoing current in the coil and the energy recovery circuit is depicted in a bold dashed line whilst the incoming current in power electronic device S4 is depicted as a fine dashed line.

According to an embodiment, in the fifth state the dc link current is directed to flow through the H-bridge without flowing in the coil with power electronic devices S3 and S4 turned on and devices S1 and S2 turned off According to an embodiment, to initiate forced commutation from the fifth switching state to the second switching state then power electronic device S3 is turned off by gate control while power electronic device S1 is turned on by gate control. The action of turning off power electronic device S3 causes the dc link current to rapidly divert through the energy recovery circuit (ERC). As the coil current Ic increases, the current in the energy recovery circuit correspondingly decreases whilst the current in power electronic device S3 correspondingly increases until the second switching state is established. The outgoing current in the power electronic device S3 and the energy recovery circuit is depicted in a bold dashed line whilst the incoming current in power electronic device S1 and the coil is depicted as a fine dashed line. It is similarly possible to force commutate between these and other states in either direction.

According to an embodiment, in the second switching state the power electronic devices S1 and S4 are turned on and dc link current is directed to flow from left to right through the corresponding coil. Power electronic devices S2 and S3 remain in the off state.

According to an embodiment, the physical locations of consecutive forced commutation events follow the above-described phase shifted retrogressive or progressive sequence.

According to an embodiment, it will be appreciated that such a force commutated system has an ability to operate with coil terminal voltage and current at a leading power factor and to operate to the above-described beneficial quadrature relationship between coil open circuit voltage and coil current.

According to an embodiment, after a force commutation event has been completed the energy recovery circuit may contain excess charge, this excess charge may accumulate following successive force commutation events and some or all of this may be injected into the dc circuit prior to the next suitable commutation event as shown in FIG. 10. This injection state can be superimposed on either of the first or second switching states. In practice, the injection of excess charge can be achieved using a DC/DC converter operated according to a pulse width modulation (PWM) strategy and may be derivative of a known forward converter. In an embodiment, the DC/DC converter may be controlled to inject this excess charge in any convenient manner and, in an embodiment, to inject current according to a closed loop voltage and current control strategy wherein current is regulated so as to maintain a desired peak voltage within the energy recovery circuit or across an energy storage capacitor within the energy recovery circuit whilst minimizing peak current. The peak voltage within the energy recovery circuit has a direct bearing upon the peak voltage that is experienced by the outgoing power electronic devices during their turn off process and also upon the forcing voltage that defines the rate of change of coil current during commutations. It is therefore beneficial that this closed loop control of energy recovery circuit voltage is practically independent of the associated coil voltage, the term 'practically independent' being used in this case to identify that: (i) the energy recovery circuit voltage cannot be set to a level that is less than the peak coil open circuit voltage, (ii) the maximum prospective extent by which the energy recovery circuit voltage may be increased beyond the peak coil open circuit voltage increases with the magnitude of coil current that is commutated, and (iii) the peak energy recovery circuit voltage may in practice be regulated to any desired level between these two limits.

According to an embodiment, the H-bridges may be configured as voltage source converters. The arrangement and operation of such H-bridges will now be described with reference to FIGS. 7, 8, 9 and 11.

Figure 11:
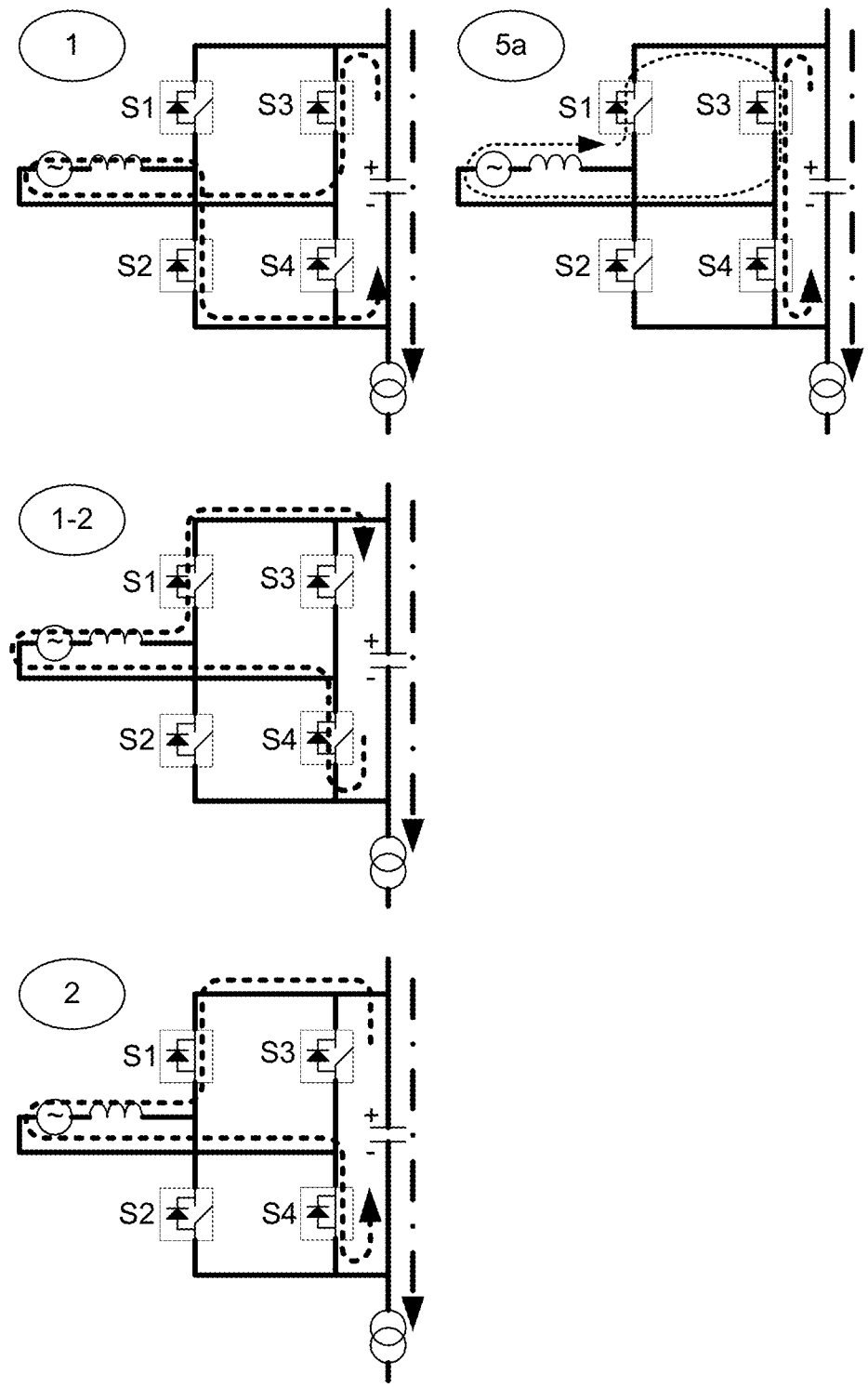
FIG. 11 shows the commutation sequence of a force commutation mode of a voltage source converter according to an embodiment of the present invention.

According to an embodiment, the voltage source converter implementation is shown schematically in FIG. 11 and has a similar H-bridge topology to that previously described with reference to FIG. 7 but power electronic devices S1, S2, S3 and S4 are asymmetric reverse conducting types and are each depicted as an ideal switch connected in parallel with a freewheel diode. A dc link capacitor is connected between the dc terminals of the switching module and an energy recovery circuit is not employed but the effect of the freewheel diodes and the dc link capacitor performs near equivalent function of defining the peak voltage that is applied to outgoing switching devices and providing the forcing voltage that defines the rate of change of coil current during commutations. Unlike conventional voltage source inverters, since a relatively large number (in an embodiment >40) of H-bridges have their dc link capacitors connected in series, a near constant dc link current is imposed upon the switching module and this is depicted schematically as an ideal current source of magnitude Idc/2. The path and polarity of this current is also identified for the motoring case by an arrow headed chain dotted line. The equivalent dc current for the generating case is not shown but would be in the opposite direction, i.e. as shown in FIG. 7. Other current paths are identified by bold and fine arrow headed dotted lines. In an embodiment, switching frequency of power electronic devices S1 ... S4 is equal to stator fundamental frequency when these are force commutated or gate commutated devices. Only a brief description of the option to employ pulse width modulation (PWM) operation of power electronic devices S1 ... S4 is included. The commutation, control and protection implications of the use of a voltage source converter are significant and are now outlined.

According to an embodiment, the polarity of the freewheel diodes has been arranged to correspond with the current flow in the devices of FIG. 7 and when in generating mode these diodes may be operated in the same naturally commutated rectifier mode as previously described in the context of a current source converter, it also being a requirement to pulse suppress the gate controlled switching devices so they remain in the off state. The effect of the dc link capacitor depends on its capacity, with large capacitances causing an increase in the ratio of peak/rms coil current. When so configured, the switching modules have no ability to regulate stator coil current waveform or normal operating generator dc output current or generator dc short circuit fault current and torque.

According to an embodiment, unlike the dc link voltage for a current source converter which reverses polarity when transitioning from generating to motoring mode and vice versa whilst dc link current remains unipolar, in the case of the voltage source converter the dc link current reverses polarity when transitioning from generating to motoring mode and vice versa whilst dc link voltage remains unipolar. In order to make this differentiation clear, FIG. 11 shows dc link current in the polarity that applies when motoring. When motoring, each H-bridge operates in an inverting mode. The voltage source inverter H-bridge topology has two near equivalent switching states to those depicted in FIG. 8 and accordingly they are also identified in FIG. 11 as a first switching states and a second switching state. In these states diagonal pairs of devices are turned on by gate control whilst opposing diagonal pairs of devices are turned off by gate control. In the first switching state the power electronic devices S2 and S3 are in the on state and current flows from left to right in the coil whilst the left side terminal of the coil has a voltage that is positive with respect to that of its right side terminal, this voltage being imposed by the voltage across the dc link capacitor. The force commutation from the first switching state to the second switching state is depicted as state 1-2 and is initiated by turning off power electronic devices S2 and S3, thereby causing a rapid diversion of current into the opposing diagonal state where the freewheel diodes that are in parallel with power electronic devices S1 and S4 conduct and for coil terminal voltage to reverse. After a so called 'dead time' which is pre-determined to eliminate the risk of simultaneous conduction of top and bottom devices in a so called 'phase leg', e.g. devices S1 and S2 of the left side phase leg must not generally be in the on state simultaneously, power electronic devices S1 and S4 are turned on whilst the freewheel diodes that are in parallel with devices S1 and S4 continue to conduct. The voltage across the dc link capacitor and coil open circuit voltage variation with time, in combination with the commutating inductance, eventually becomes sufficient to cause coil current to reverse. The second switching state is established at the point in time when coil current reverses. The currents that flow in power electronic devices S1 . . . S4 cause current to flow in the dc link capacitor in a first polarity whereas the currents that flow in the freewheel diodes that are in parallel with devices S1 . . . S4 cause current to flow in the dc link capacitor in the opposite polarity. Thus an ac ripple current flows in the dc link capacitor and upon this is superimposed the above-defined near constant dc link current. In this voltage source inversion mode of operation the H-bridges have a limited ability to control coil power factor but have minimal ability to regulate the coil current waveform in a manner that permits the preferred quadrature relationship between coil current and coil open circuit voltage to be attained at the same time as the preferred synchronisation of low order integer harmonic currents and voltages. The voltage source converter inherently operates with a peak voltage across the dc link capacitor that is approximately equal to the peak coil open circuit voltage. As the capacity of the dc link capacitor is increased, the dc link voltage ripple reduces whilst the ratio of peak/rms coil current increases. As the capacity of the dc link capacitor is reduced, the dc link voltage ripple increases whilst the ratio of peak/rms coil current reduces and the rate of change of current during commutations becomes ill-defined.

The preceding description of voltage source converter operation with power electronic device switching frequency constrained to be the same as stator fundamental frequency has identified performance limiting factors that are related to an inability to control coil current waveform in the preferred manner and it is a technical possibility to address these factors using PWM control of each switching module. Whilst PWM operation makes it possible to achieve an increased degree of independence between coil current waveform control, coil open circuit voltage and dc link voltage, this would be achieved at the expense of increased switching frequency, increased switching power losses and increased complexity.

According to an embodiment, the voltage source converter has near equivalent switching states to the fourth and fifth switching states of FIG. 8 and each state has two forms according to the polarity of coil open circuit voltage. Accordingly, the first form of the fifth switching state is depicted and is identified as state 5a. In this state, the power electronic devices S3 and S4 are simultaneously selected to be in the on state and the short term effect of this is to cause a surge current type discharge of the dc link capacitor which causes devices S3 and S4 to experience a short term and potentially damaging thermal overload. It is possible to design these devices so they retain an ability to carry current after the above-described surge current and a potentially beneficial first long-term effect of this is to provide a path for dc link current that could be used in order to allow dc link current to bypass a faulty switching module. A disadvantageous second long-term effect of this is to provide a current path in which the associated coil is short circuited by the series connected path comprising the freewheel diode that is in parallel with power electronic devices S1 and S3. The first form of the fifth switching state is effective during the half cycle of coil open circuit voltage when the right side terminal of the coil is at a positive voltage with respect to that of the left side terminal. A corresponding second form of the fifth switching state (i.e. state 5b, not shown) is effective during the other half cycle of coil open circuit voltage when the associated coil is short circuited by the series connected path comprising the power electronic device S4 and the freewheel diode that is in parallel with power electronic devices S2. Corresponding forms of the fourth switching states are effective in corresponding half cycles of coil open circuit voltage when power electronic devices S1 and S2 conduct simultaneously. A fuse or other circuit interruption means must be connected in series with each coil if the potential benefit of the fourth or fifth switching states are to be exploited in order to provide gradual degradation of performance following switching module failures.

Figure 12:
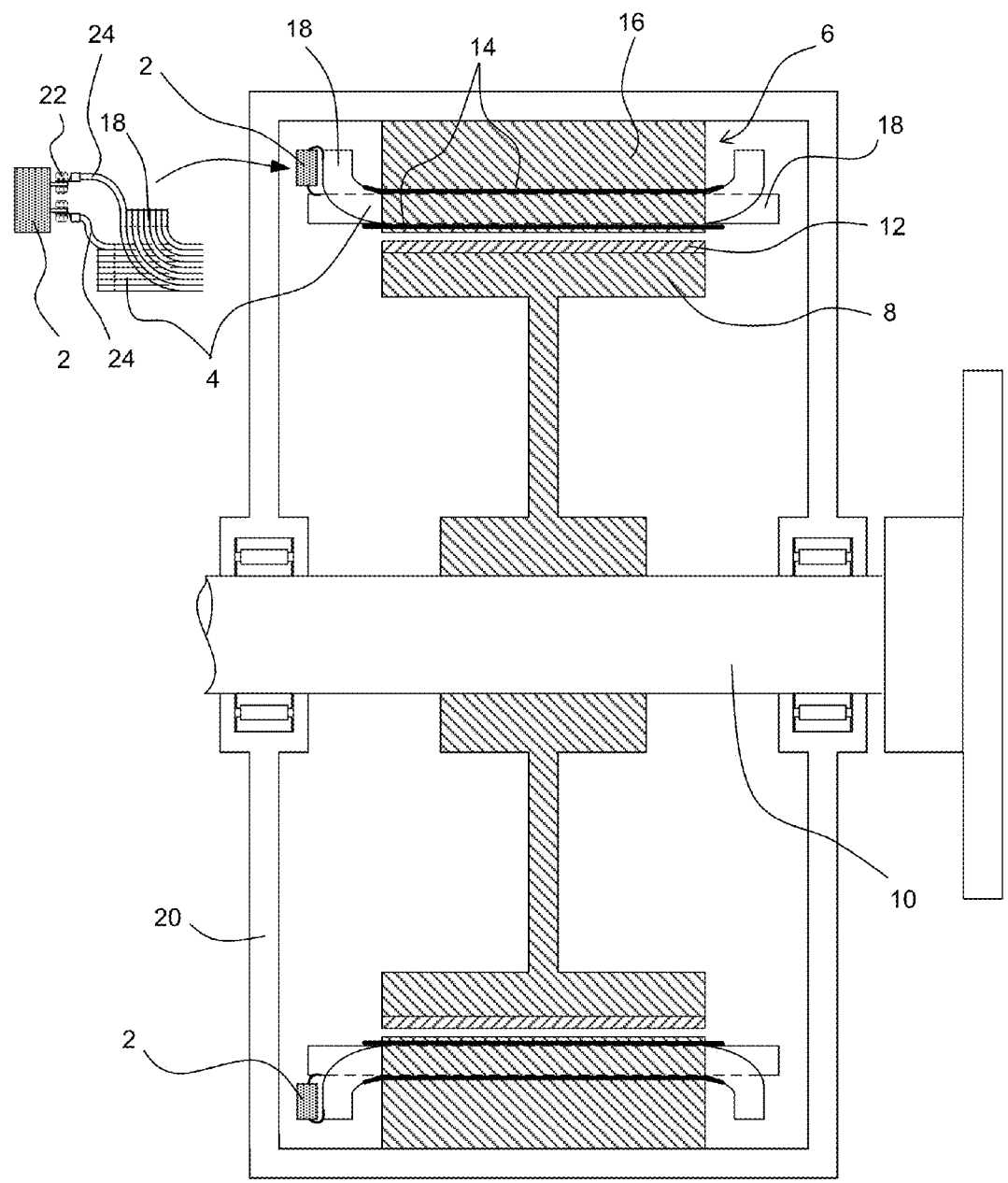
FIG. 12 is a cross section through a dc electrical machine according to an embodiment of the present invention as illustrated in FIG. 4 showing how the switching modules are mounted to the endwindings.

According to an embodiment, FIG. 12 shows how the switching modules 2 can be mounted to the electrical machine. The electrical machine has single-layer coils 4, as shown schematically in FIG. 4, that are located in stator slots provided in the stator assembly 6. But it will be readily appreciated that electrical machines having two-layer or tooth concentrated windings could employ a similar general arrangement, the end coil winding overhangs having their respective forms.

According to an embodiment, a rotor 8 is mounted to a rotor shaft 10. A circumferentially-spaced array of permanent magnets 12 are mounted on a radially outer surface of the rotor 8 and are spaced apart from the stator by an air gap.

According to an embodiment, main wall insulation 14 surrounds the in-slot region of the coil sides and extends into the air space beyond the axial ends of the stator core pack 16. The ends of the coils are formed to allow clearance between endwinding overhangs 18. Since the in-slot region of the main wall insulation 14 is exposed to radial voltage stress that is dominated by a dc voltage component its electric field distribution is governed by the resistivity of the insulation material. Its ability to withstand a high mean electric field strength can be enhanced by incorporating a fine and evenly distributed nano-particulate filler material so the composite insulation material has a non-linear relationship between leakage current and voltage, or which renders the bulk of the insulation to be stress graded with respect to the dominant dc voltage stress. More particularly, the composite insulation material has a substantially isotropic resistivity characteristic and the main wall insulation 14 is extended beyond the slot ends so as to provide axial voltage stress grading at the surface of the endwinding overhang 18 as it exits the in-slot region. Sufficient axial stress grading is required in order to overcome the risk of surface voltage breakdown or tracking and this may be provided entirely by the end extensions of the composite main wall insulation material or by the application of dedicated stress grading tape or coating over the surface of the end extensions of the composite main wall insulation material. The composite insulation material can comprise an epoxy resin and a distribution of silicon carbide nano-particles. In an embodiment, the particle size distribution of the filler will be such as to ensure contact between asperities of particles substantially uniformly throughout the bulk of the insulation.

A benefit according to an embodiment of the present invention over conventional electrical machines whose insulation systems experience significant ac losses and partial discharge is that the above-described stress grading mechanism, in being defined in terms of the dominance of dc voltage stress over ac voltage stress, and in having defined insulation system resistivity, experiences minimal dissipation or discharge in response to ac voltage stresses. Accordingly, the stress grading mechanism beneficially improves insulation system stability and life expectancy. A further benefit according to an embodiment of the present invention over conventional electrical machines whose coils are series interconnected in the ac domain, wherein these series interconnections potentially extend over many pole pitches, and wherein the inter-coil insulation systems therefore experience significant ac voltage stresses, losses and partial discharge, is that the inter-coil voltage is minimal and consequently inter-coil insulation experiences a low voltage stress. Accordingly, an embodiment of the present invention would allow coils to be wound and pre-formed with minimal strand insulation and then discharge-free main wall insulation components could be assembled around the in-slot regions of the coil sides using a void-free process, and finally the pre-formed and pre-insulated coils could be inserted into stator slots.

According to an embodiment, the stator 6 of the electrical machine can be cooled by radial air flow through ducts (not shown) that are formed by providing spaces between lamination surfaces in the stator core pack at intervals along its axial length. The flow through these ducts may be radially inwards or radially outwards and may be forced by shaft-driven fans or electric fans, for example. The air flow can be in a dual or single toroidal closed circuit which comprises the space between the stator housing 20 and the outside of the stator back iron, the endwinding overhangs 18 and the air gap between the rotor 8 and stator 6. In an electrical machine which has a relatively large external surface area in relation to its power output, the heat can be dissipated to ambient temperature by this surface area but it may in any case be supplemented by adding a suitable heat exchanger which may be simple augmentation of the external surface area of the stator or an adaptation to include internal or external surfaces that are in contact with a suitable heat exchange fluid and a remote heat exchanger. The stator end shields and/or suitable baffles may direct the air flow through the endwinding overhang region at the axial ends of the stator. In some embodiments, the stator may be sufficiently well cooled without recourse to the above-mentioned air circuits (i.e. may be cooled by conduction through the stator assembly to the external surface of the stator assembly or to a heat exchanger).

According to an embodiment, the switching modules 2 are located in close proximity to the endwinding overhangs 18 so that there is a short connection between the ac terminals 22 of each switching module and the corresponding coil ends. The switching modules 2 are operated at substantially the same voltage as the coils and must therefore be insulated from the stator frame 20. Minimal insulation is needed between each switching module 2 and its corresponding coil 4.

In an embodiment where the electrical machine uses an internal air circuit, the switching modules can also be air cooled and benefit from the radial air flow that is used to cool the endwinding overhangs. In an embodiment, the power electronic devices are electrically and thermally connected to the coils 4 by short coil leads 24 and so devices that can operate at temperatures approaching the coil end temperature (in an embodiment <150° C.) are employed. This would include power electronic devices that employ wide bandgap materials such as silicon carbide. In an embodiment, the switching modules can be arranged to permit the power electronic devices to be cooled by the coil endwindings and the switching modules may be secured to the endwinding overhang surfaces using a suitable electrically insulating but thermally conductive interface. Other components within the switching modules are less well thermally connected to the coil ends and may be rated in accordance with the cooling air temperature.

Figure 13:
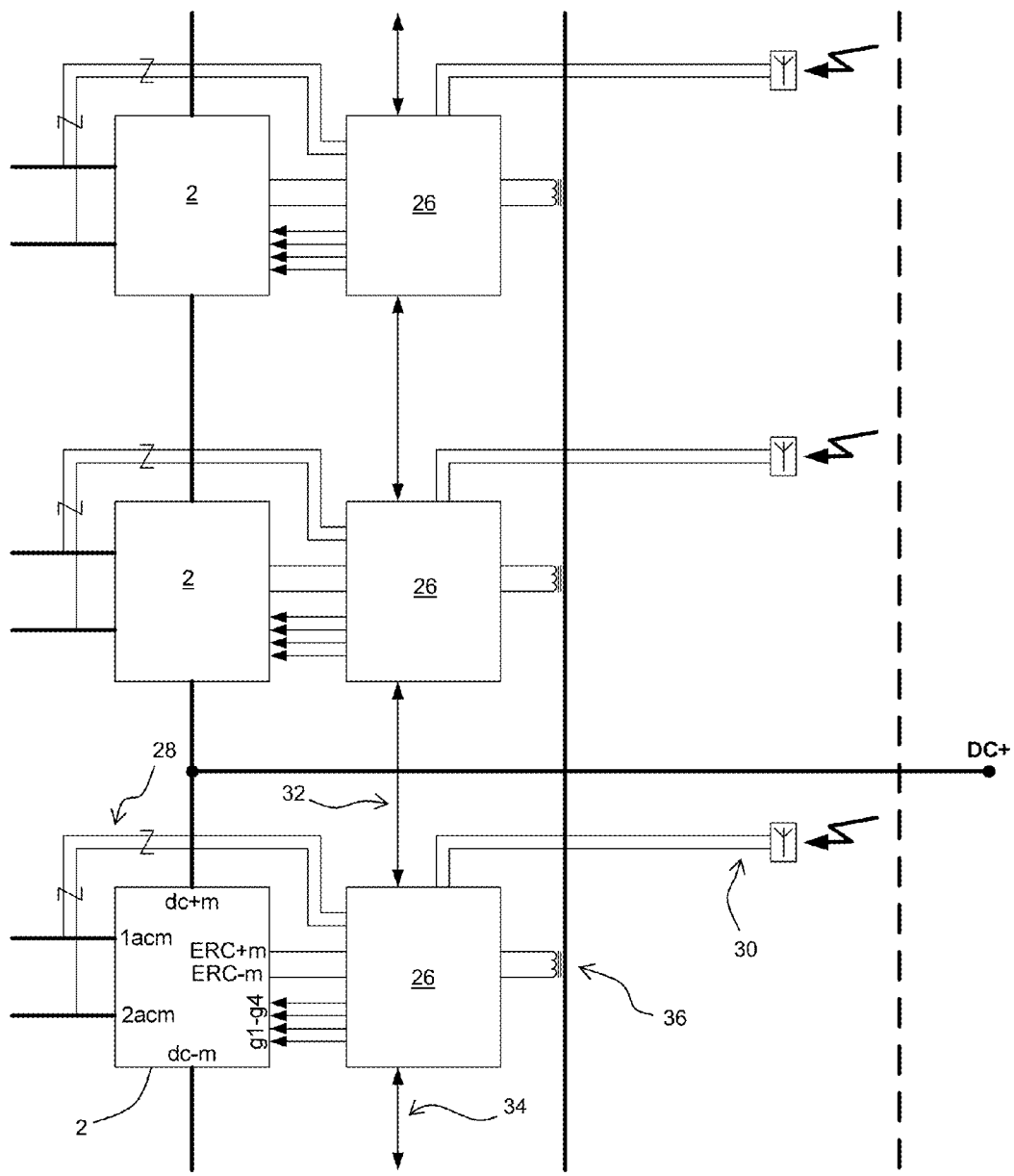
FIG. 13 is a simplified control schematic for switching modules according to an embodiment of the present invention.
Figure 14A:
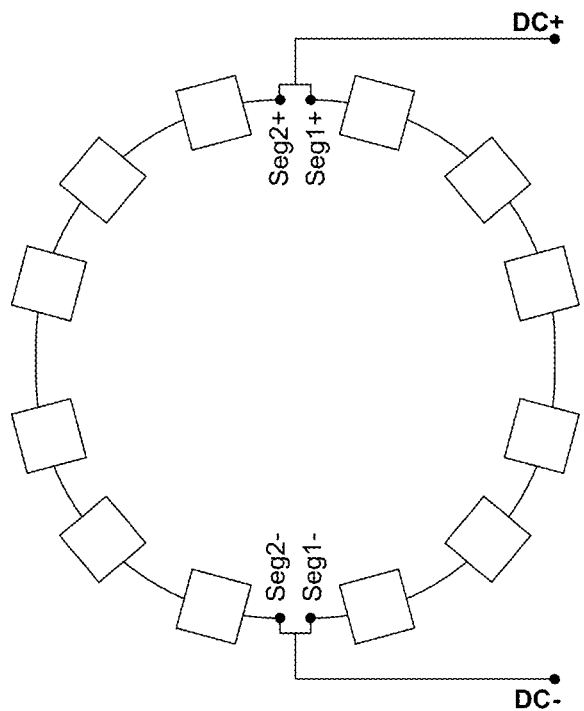
FIGS. 14A, 14B, 14C, and 14D are schematic diagrams showing the arrangement of local dc terminals and interconnection of switching modules for segments of the electronic power switching assembly according to an embodiment of the present invention.
Figure 14A:
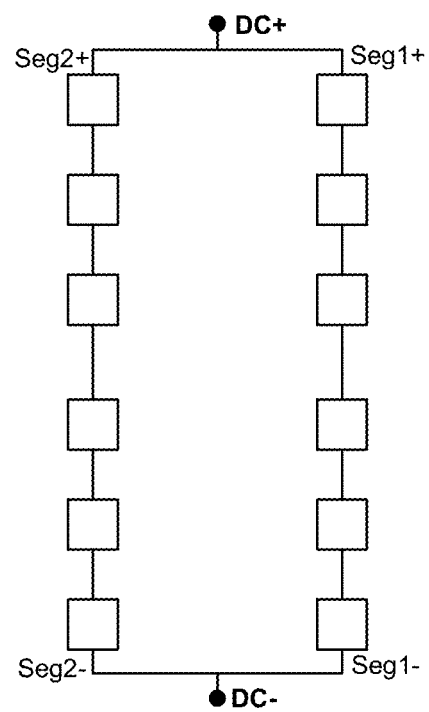
Figure 14B:
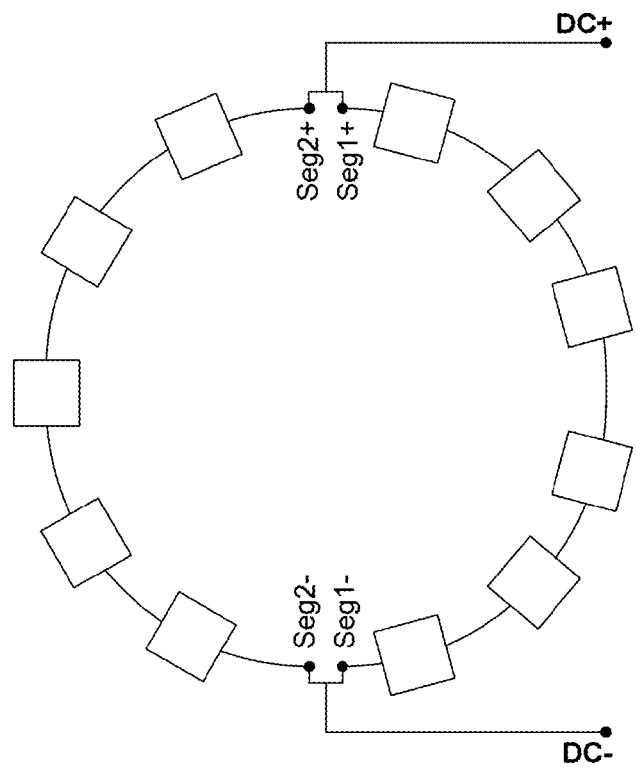
Figure 14B:
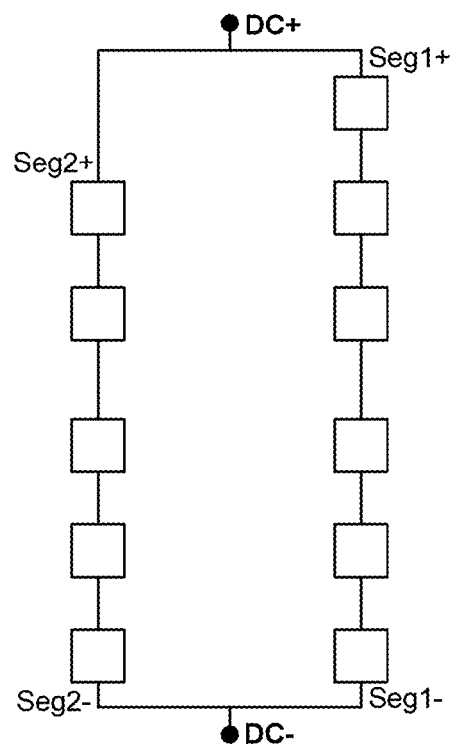
Figure 14C:
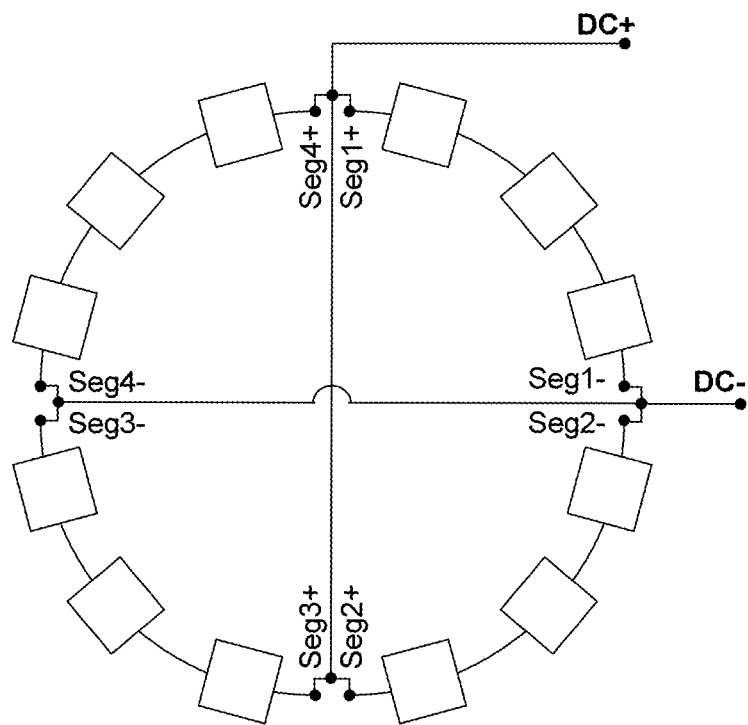
Figure 14C:
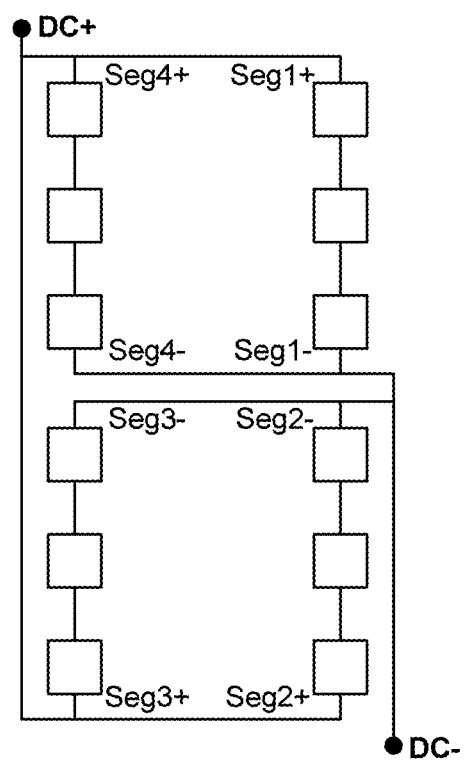
Figure 14D:
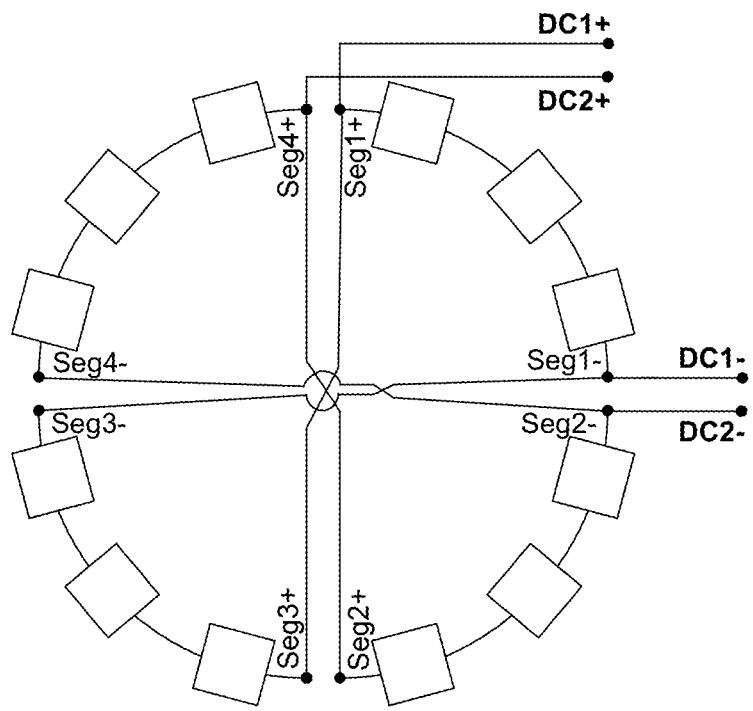
Figure 14D:
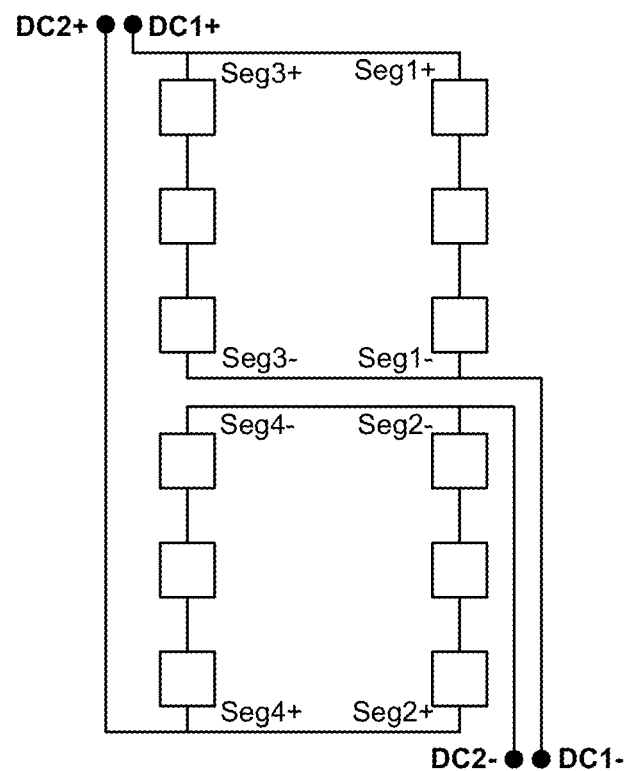

According to an embodiment, with reference to FIG. 13, the switching modules 2 are self-contained as much as possible in order to simplify auxiliary power supply and control interfaces and maximize reliability. Gate drive signals g1 . . . g4 for the power electronic devices S1 . . . S4 that define the H-bridge can be provided from an associated controller 26. The voltage at the terminals of the energy storage capacitor of the energy recovery circuit (or at the dc link capacitor of a voltage source converter type switching module) is provided as a synchronisation signal and a power supply voltage to the controller 26. Such voltage is equal to, or greater than, the rectified peak of the coil terminal voltage.

More particularly, according to an embodiment, each controller 26 receives the synchronisation signal and power supply voltage ERC±m from the corresponding energy recovery circuit, the respective coil terminal voltage 28, a common reference signal 30 (which can be transmitted wirelessly), a synchronisation signal 32 from a first adjacent switching module, and a synchronisation from a second adjacent switching module 34. Each controller may also optionally receive an auxiliary power supply input, e.g. from a local pulse transformer 36 with appropriate insulation system. The controller 26 provides gate signals g1 . . . g4 to the power electronic devices S1 . . . S4 and optionally also to any power electronic devices in the energy recovery circuit.

According to an embodiment, the internal power supplies within each controller 26 are derived by a switched mode power supply (not shown) which receives the power supply voltage from the energy recovery circuit (or from the dc link capacitor of a voltage source converter type switching module). While the electrical machine is rotating at at least 10% of rated speed, the power supply requirements of each controller 26 are satisfied and it is possible for an electrical machine to be black started providing the control system permits this. Under normal operating circumstances, the controllers 26 do not need any other form of power supply input. Under other operating circumstances, for example if a permanent magnet generator is required to motor at a very low speed, the controllers receive power from the auxiliary power supply input.

According to an embodiment, a set of reference data transmitted as part of the common reference signal 30 includes at least a phase shift reference and a pulse width reference. It may also include a speed reference, direction and synchronisation pulses for motoring control purposes. Each controller 26 synchronises to the corresponding coil terminal voltage 28 and determines the direction of rotation by comparing the synchronisation signals 32, 34 provided by the adjacent first and second switching modules. The coil terminal voltage/frequency ratio will be substantially constant over the intended working speed (e.g. for the electrical machine described above according to embodiments as shown in FIGS. 1 and 4 this might be 0.2 pu-1.1 pu of rated speed) and the synchronisation with respect to coil terminal voltage may beneficially employ a hardware integrator function whose output has a substantially constant peak to peak ac voltage output. The synchronisation function generates a phase reference signal from which the timing of individual switching events in the switching module 2 are determined. In the case of a controller that is adapted to the requirements of a current source converter, the default pulse width reference might be that which causes a symmetric trapezoidal current waveform to be drawn from the coil terminals by providing gate drive signals corresponding to the first and second switching states outlined above for equal half-cycle durations, less the duration of the commutation process. Other pulse width reference conditions cause a symmetric quasi-square current waveform to be drawn from the coil terminals as previously described. There is little opportunity to control the coil current waveform in the case of a voltage source converter. The respective phase shifts between the gate drive signals g1 . . . g4 for the power electronic devices S1 . . . S4 and the coil terminal voltage are generated in response to a common phase shift reference input. As previously described, the coil terminal voltages are not the same as the coil open circuit voltages and this is because the coil open circuit voltages are not accessible—accordingly the common phase shift reference must include an estimated term as compensation for the reactive voltage drop within the coils. This compensation is provided by an overall controller (not shown, but with which the controller 26 can optionally be combined or integrated) which can include sensors for the current and voltage at the first and second dc load terminals of the power electronic switching assembly and has commutating inductance data.

Whereas a permanent magnet generator or separately excited generator application is not necessarily reliant upon the ability of the control system to synchronise to coil voltage at all times because a renewable energy source (e.g. wind turbine assembly) or prime mover (e.g. a diesel engine or turbine) may be used to rotate the rotor shaft from standstill and up to a minimum speed at which coil voltages are sufficient to allow the control system to be effective, a motoring application is inherently reliant upon control functionality to rotate the rotor shaft from standstill. The above-described control functions effectively define an encoder-less control system that is effective at speeds greater than about 0.1 pu, this limitation being set by the synchronisation of the power electronic devices firing events to a phase reference signal that is derived from integrated stator voltage. At speeds below about 0.1 pu the coil voltages are not sufficient to allow the control system to be effective and there is a requirement for the power electronic firing events to be synchronised with shaft absolute position. Any convenient form of shaft absolute position encoder may be employed and its output data may be provided to an overall controller (not shown). The output data may therefore be incorporated within the set of reference data that is transmitted as part of the common reference signal 30 that is transmitted to all controllers 26. In most common motoring applications the controller 26 for each switching module 2 will include a function that allows the firing events for the power electronic devices S1 . . . S4 that define the H-bridge to be synchronised to a phase reference signal that is derived from the sum of shaft absolute position and a pre-set position offset according to the location of the switching module within the stator assembly when stator voltage is insufficient to allow the control system to be effective. The overall controller is responsible for controlling how power is delivered into a load when the machine is generating and how power is provided to the machine when motoring and this is achieved by setting the set of reference date in accordance with overall controller references and feedback inputs which would be known to the skilled person and need not be described further.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A dc electrical machine comprising:
 a rotor comprising Np rotating field poles;
 an armature comprising Ns winding slots, where Ns/Np is a non-integer ratio;
 an armature winding comprising a plurality of coils received in the winding slots, the armature winding defining a plurality of armature phases; and
 a power electronic switching assembly comprising:
  a first dc load terminal;
  a second dc load terminal; and
  a plurality of switching modules, wherein each switching module comprises two ac terminals, two dc terminals, and power electronic devices;
 wherein each coil is connected to the ac terminals of a respective switching module, and
 wherein a first proportion of the plurality of switching modules have their dc terminals connected together in series between the first dc load terminal and the second dc load terminal, and a second proportion of the plurality of switching modules have their dc terminals connected together in series between the first dc load terminal and the second dc load terminal to define two parallel dc circuits.

2. The dc electrical machine according to claim 1, wherein Ns/Np is expressed as n±δ, where n is an integer and δ is a non-integer vernier shift.

3. The dc electrical machine according claim 2, wherein the field poles are equally distributed around the circumference of the rotor, and the vernier shift is consistent around the armature.

4. The dc electrical machine according to claim 1, further comprising an armature phase sequence wherein physically remote armature coils are adjacent in the armature phase sequence.

5. The dc electrical machine according to claim 4, wherein the direction of rotation of the armature phase sequence is the same as, or opposite to, the direction of rotation of the rotor.

6. The dc electrical machine according to claim 1, wherein each armature phase is defined by two or more armature coils, and wherein the switching modules for each armature coil in a particular armature phase are controlled so that their switching events occur substantially simultaneously.

7. The dc electrical machine according to claim 6, wherein the armature coils in a particular armature phase are circumferentially spaced substantially equally around the armature.

8. The dc electrical machine according to claim 1, wherein the coils of the armature winding define Ns/2, Ns/4, or Ns armature phases.

9. The dc electrical machine according to claim 8, wherein the coils of the armature winding are two-layer coils, single-layer coils, or tooth coils.

10. The dc electrical machine according to claim 1, wherein the armature further comprises a circumferential datum and the magnitude and polarities of the voltages that are developed in the parallel dc circuits on the opposite sides of the datum are substantially balanced.

11. The dc electrical machine according to claim 1, wherein a third proportion of the switching modules of the plurality of switching modules have their dc terminals connected together in series between the first dc terminal and the second dc terminal, and a fourth proportion of the switching modules of the plurality of switching modules have their dc terminals connected together in series between the first dc terminal and the second dc terminal to define two additional parallel dc circuits.

12. The dc electrical machine according to claim 1, wherein the power electronic switching assembly further comprises a third dc terminal and a fourth dc terminal, and wherein a third proportion of the switching modules of the plurality of switching modules have their dc terminals connected together in series between the third dc terminal and the fourth dc terminal, and a fourth proportion of the switching modules of the plurality of switching modules have their dc terminals connected together in series between the third dc terminal and the fourth dc terminal to define two parallel dc circuits.

13. The dc electrical machine according to claim 1, wherein each switching module comprises an H-bridge with ac terminals connected to ac terminals of a corresponding armature coil and dc terminals.

14. The dc electrical machine according to claim 13, wherein each switching module comprises an energy recovery circuit connected to the ac terminals and the dc terminals of the corresponding H-bridge.

15. The dc electrical machine according to claim 1, wherein each switching module is controlled by a control system.

* * * * *